April 16, 1968  J. STEVENSON, JR., ET AL  3,378,128
CARTON TRANSFER APPARATUS
Filed July 8, 1966  17 Sheets-Sheet 5
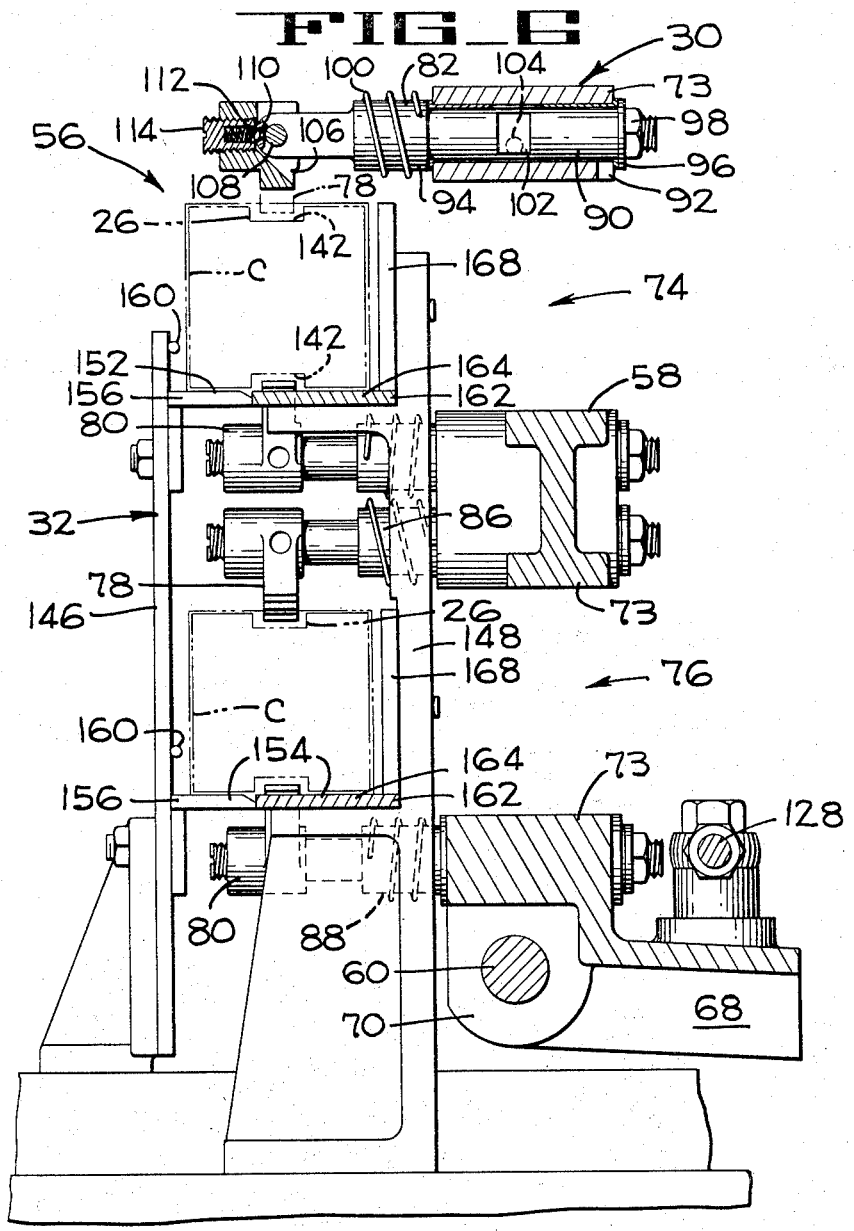
INVENTORS
JOHN STEVENSON, JR.
ROBERT E. TAGGART
BY Francis W. Anderson
ATTORNEY

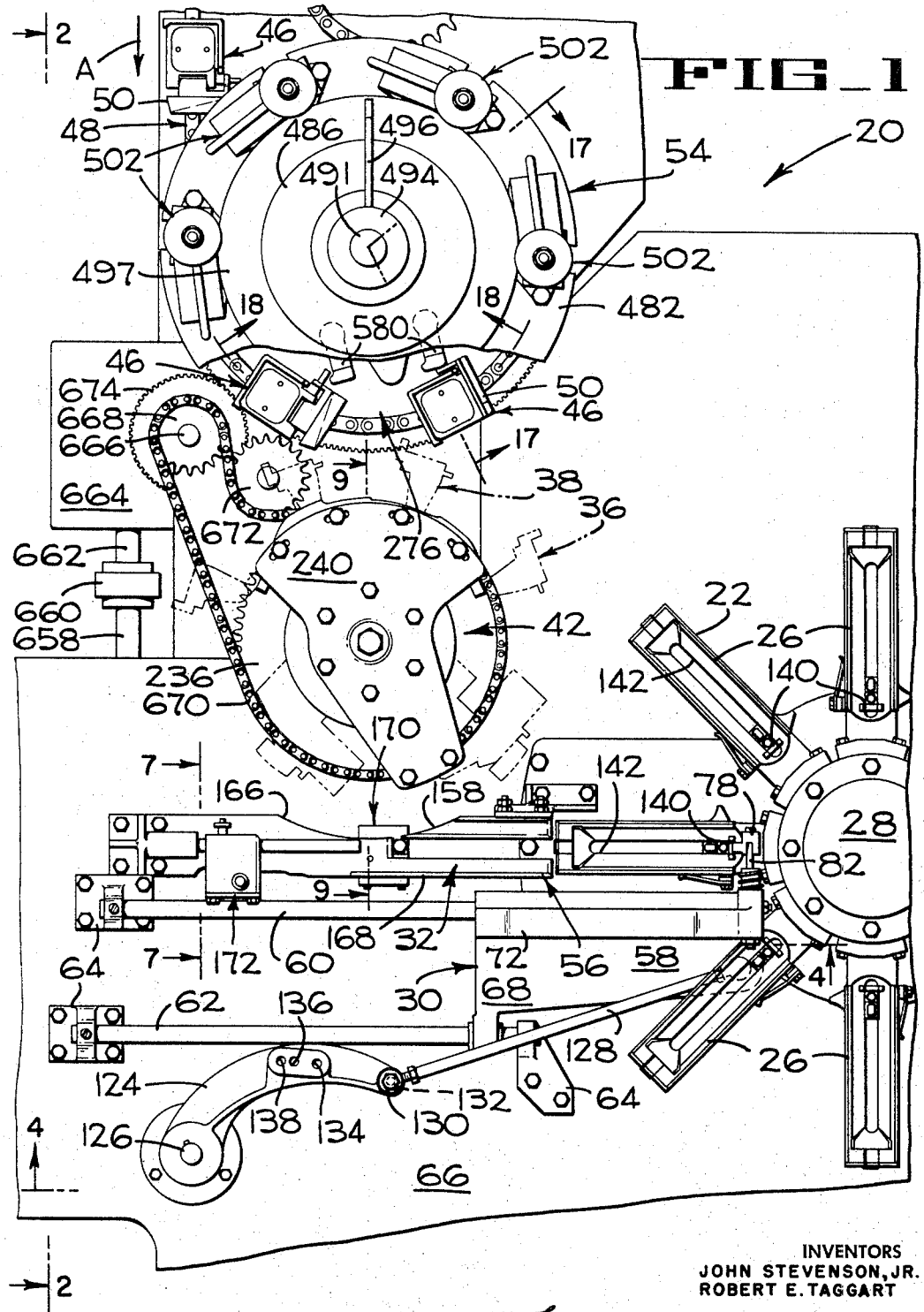

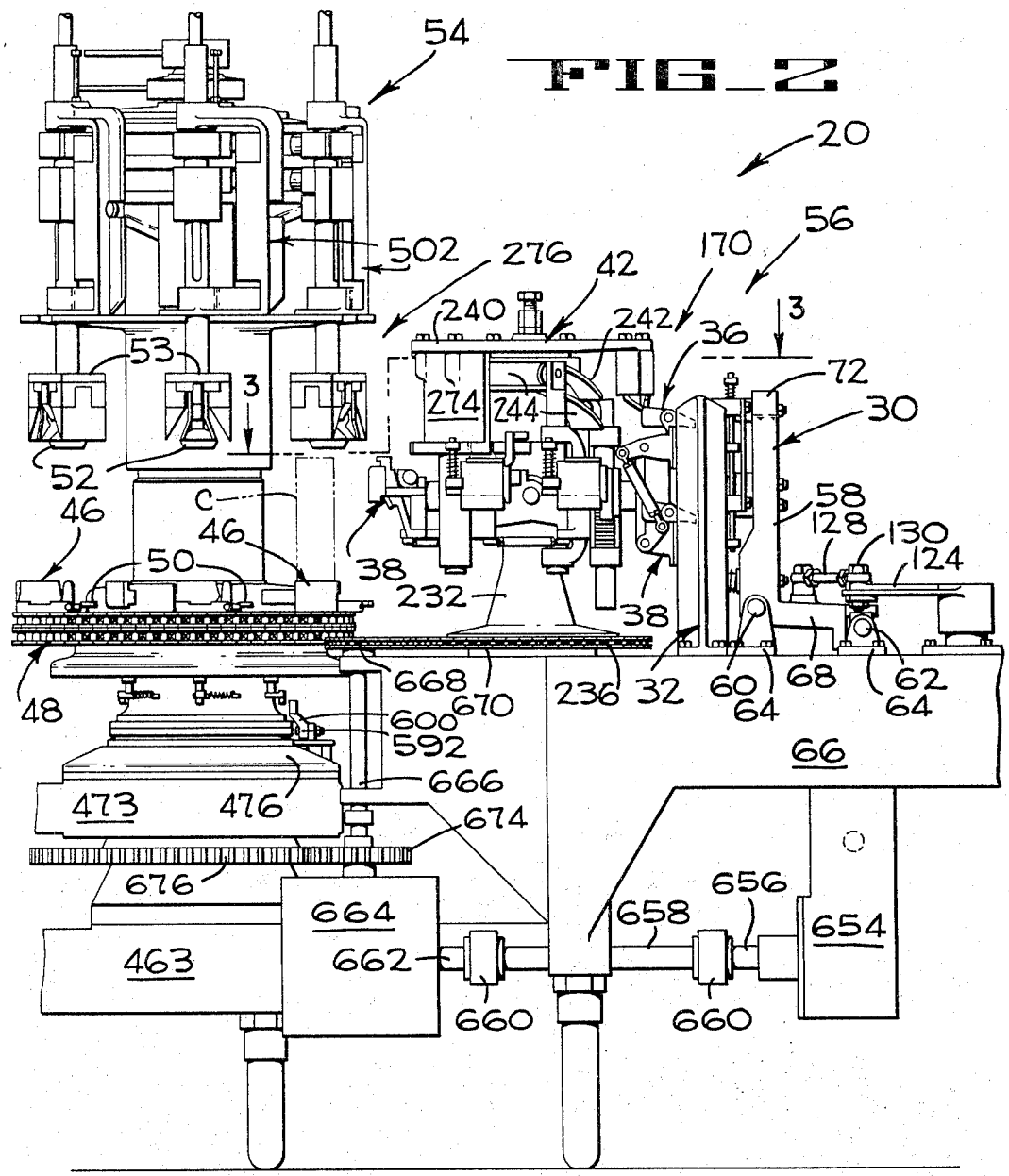

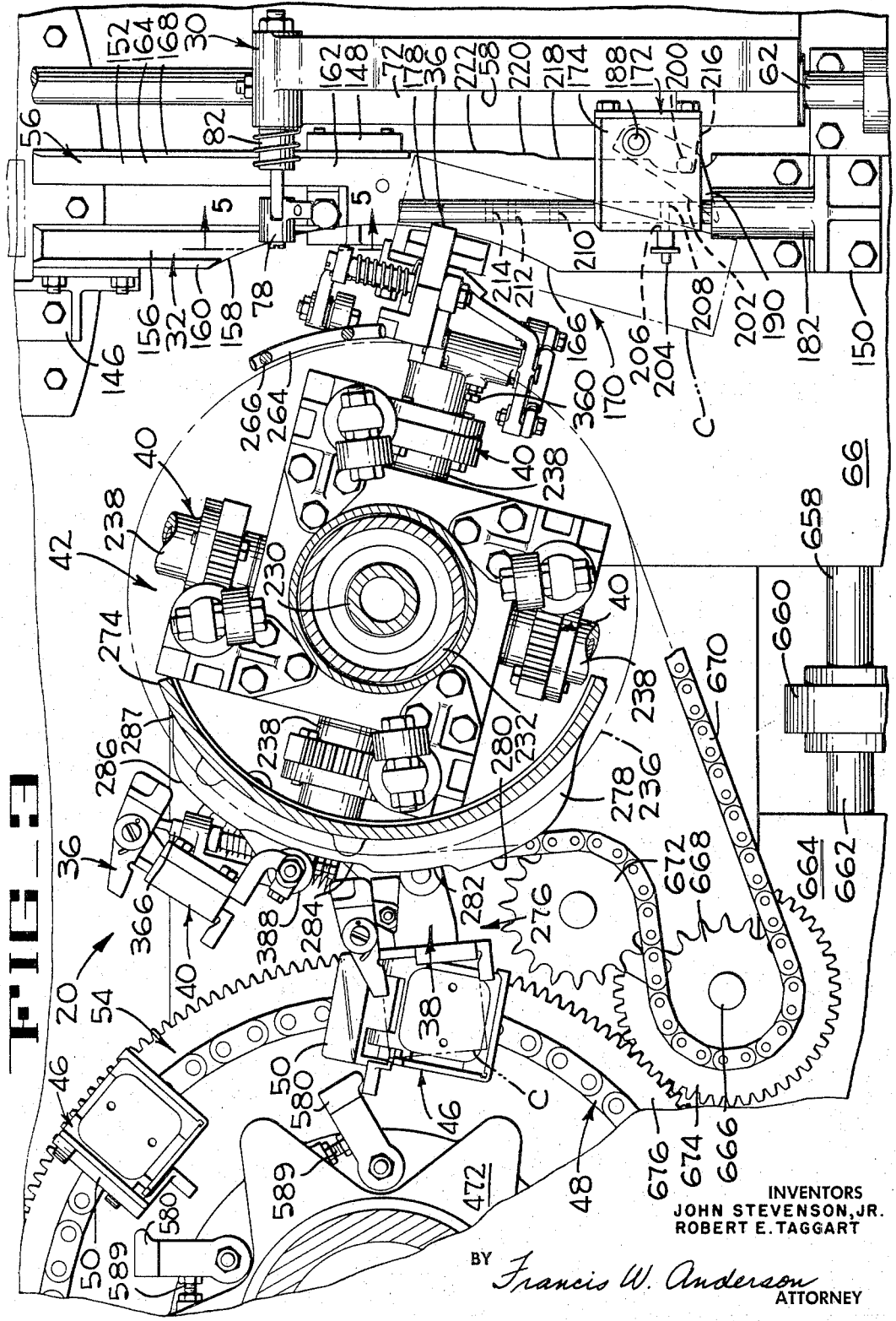

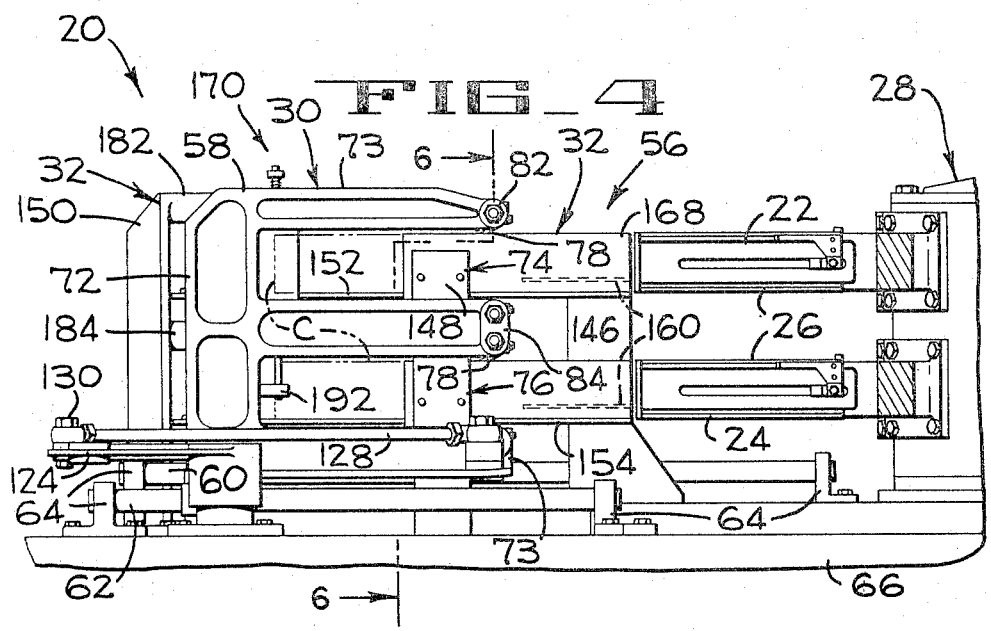
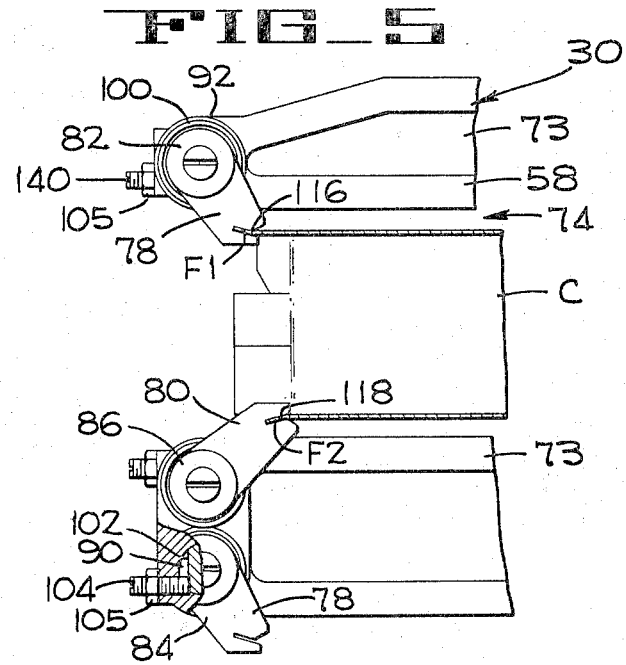

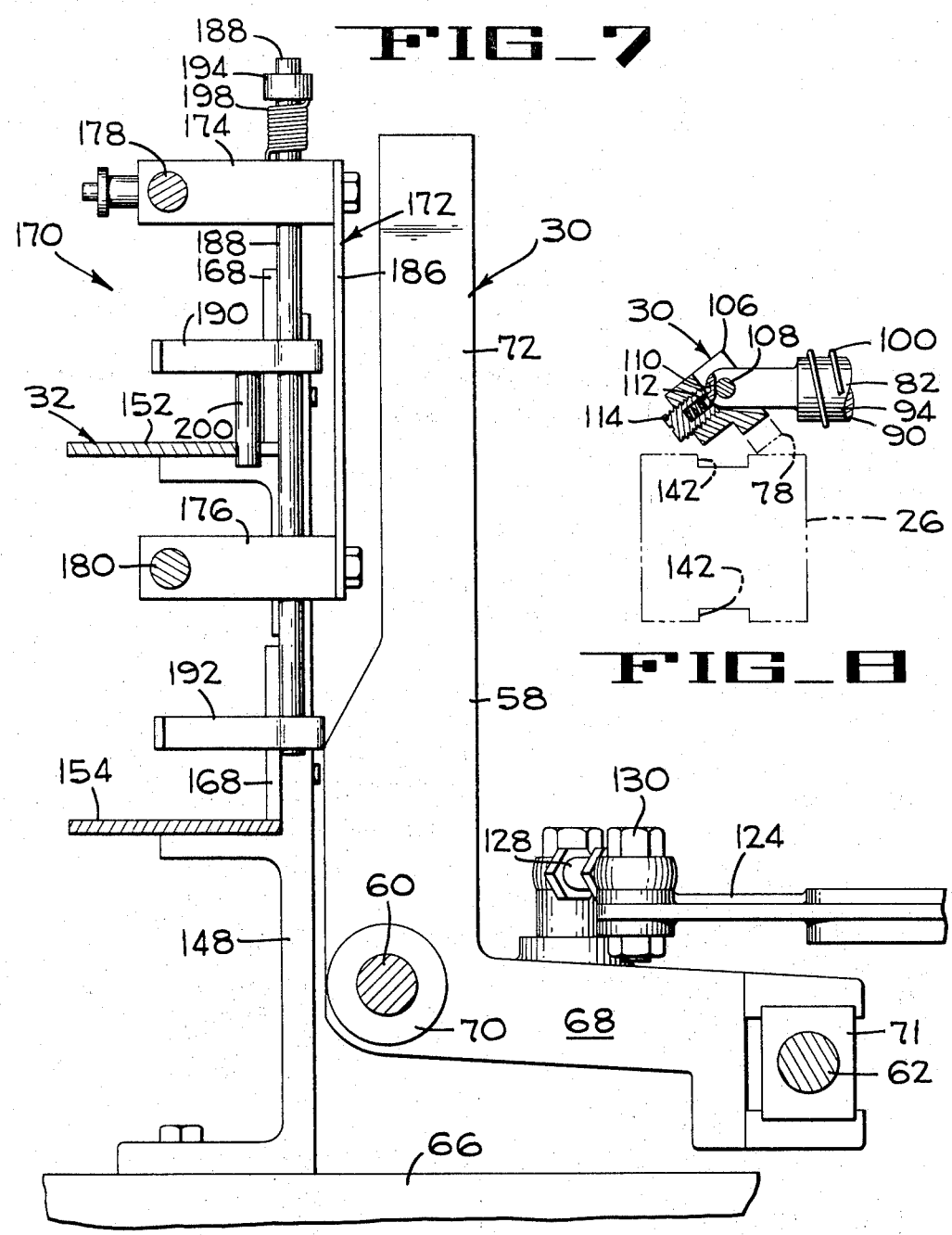

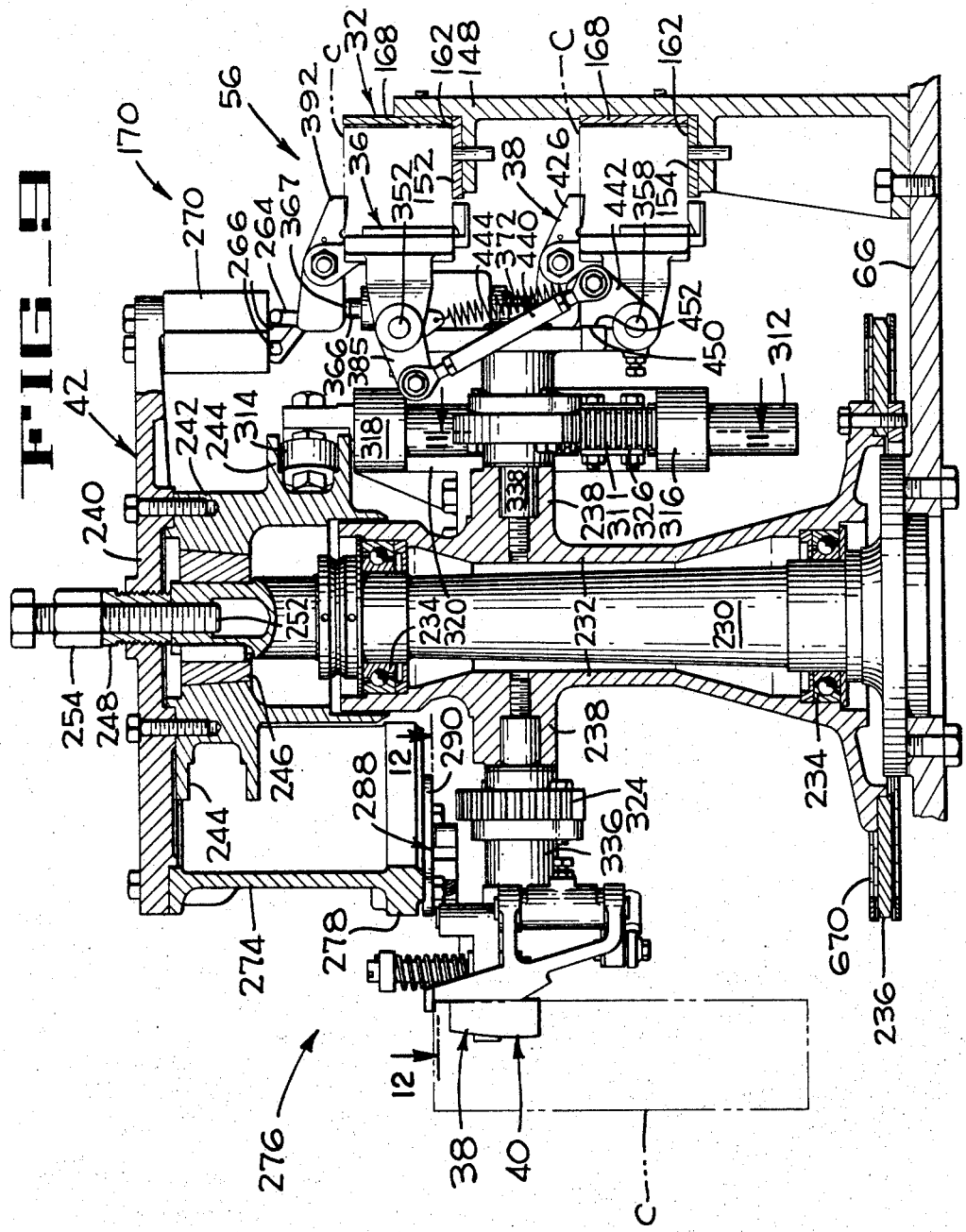

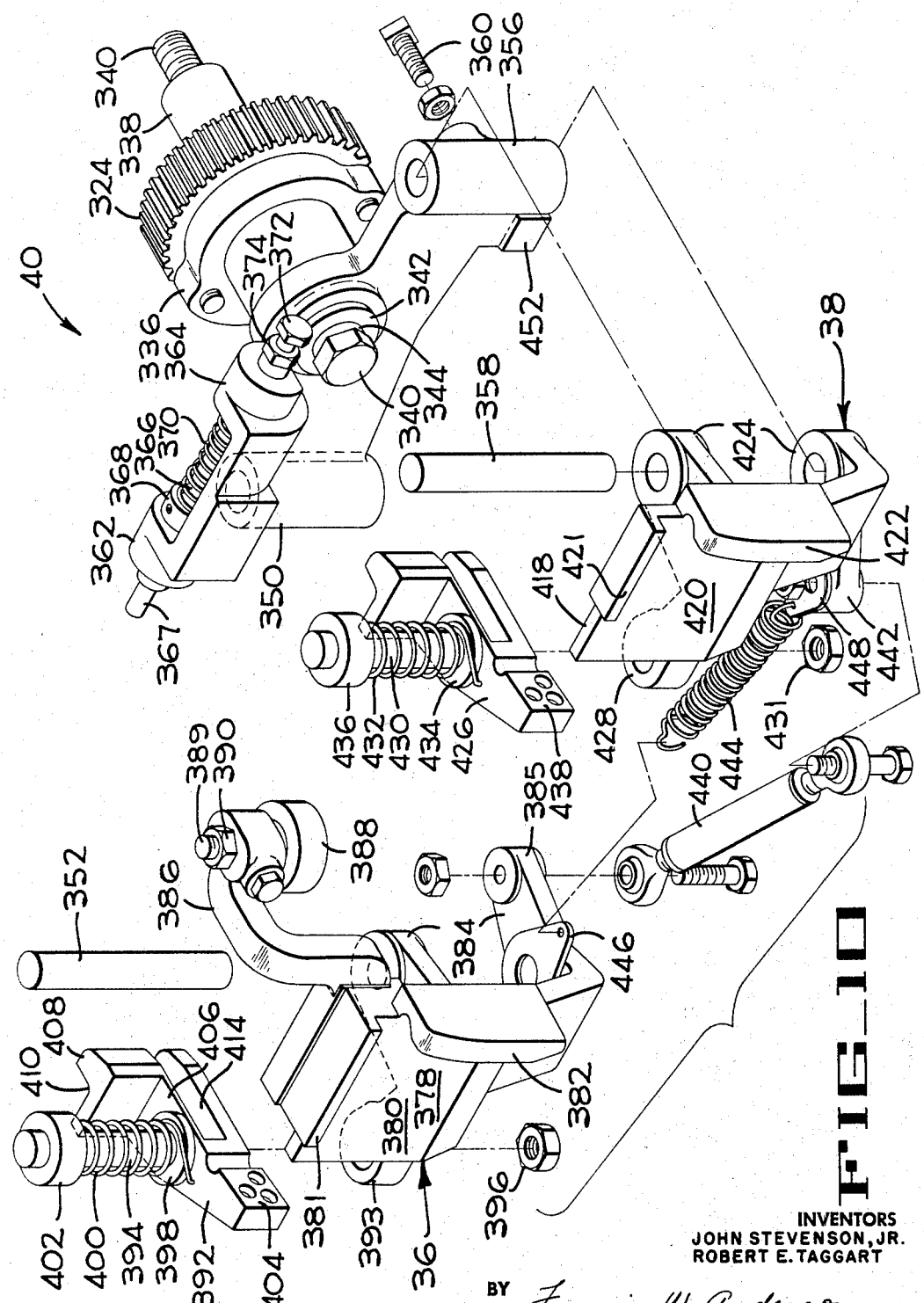
FIG_10

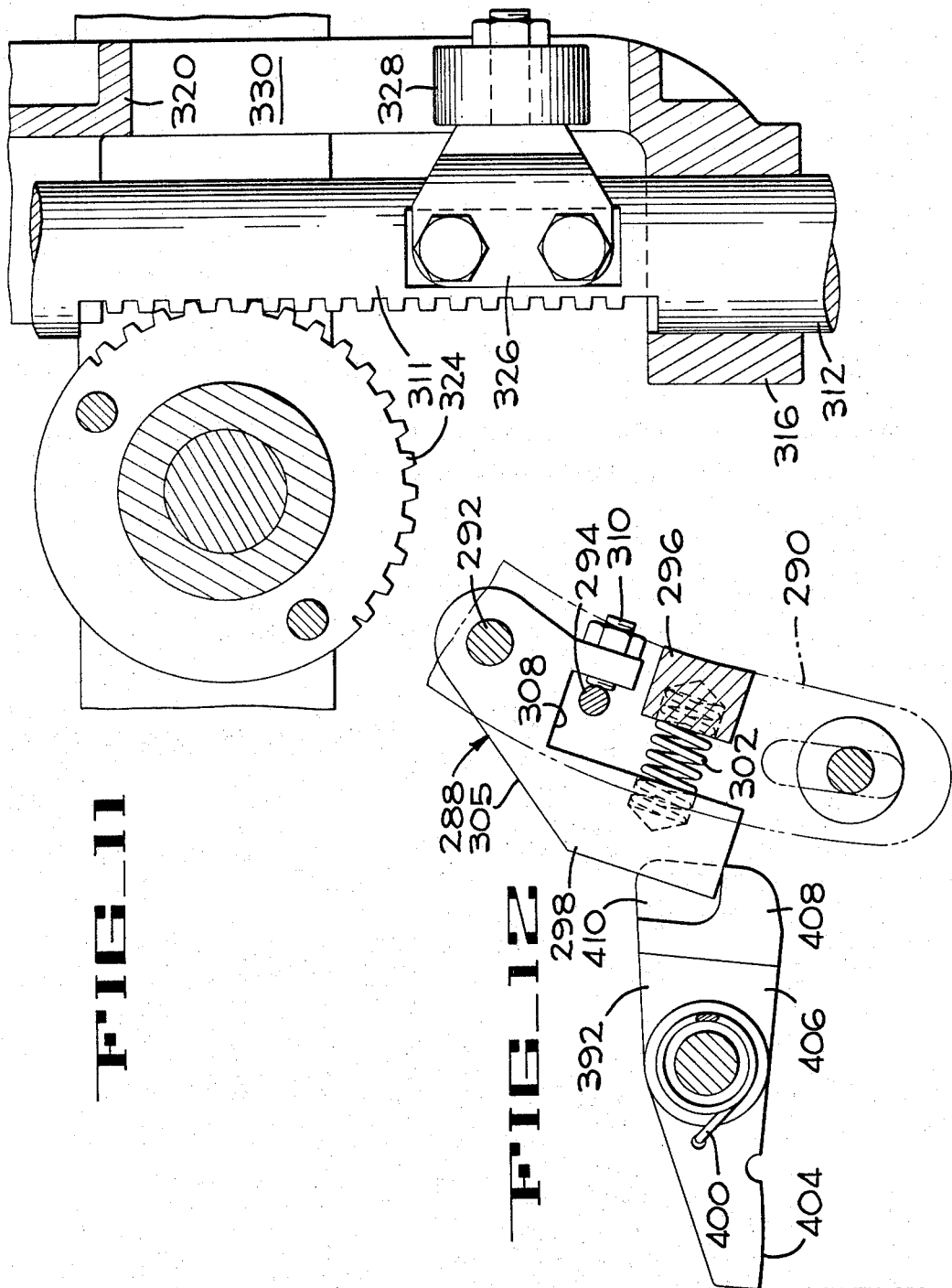

April 16, 1968   J. STEVENSON, JR., ET AL   3,378,128
CARTON TRANSFER APPARATUS
Filed July 8, 1966   17 Sheets-Sheet 10
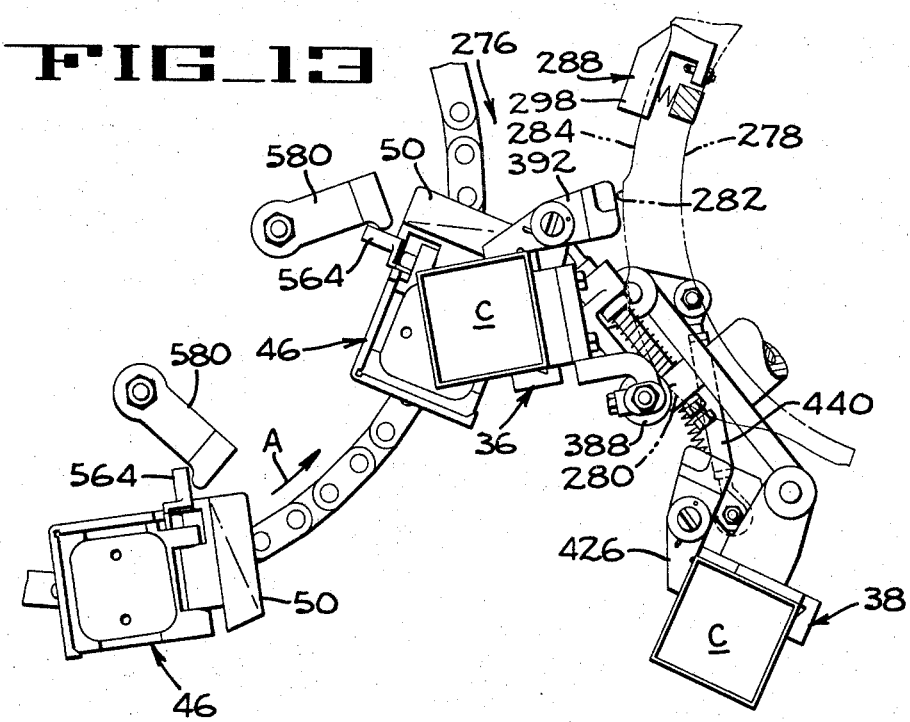
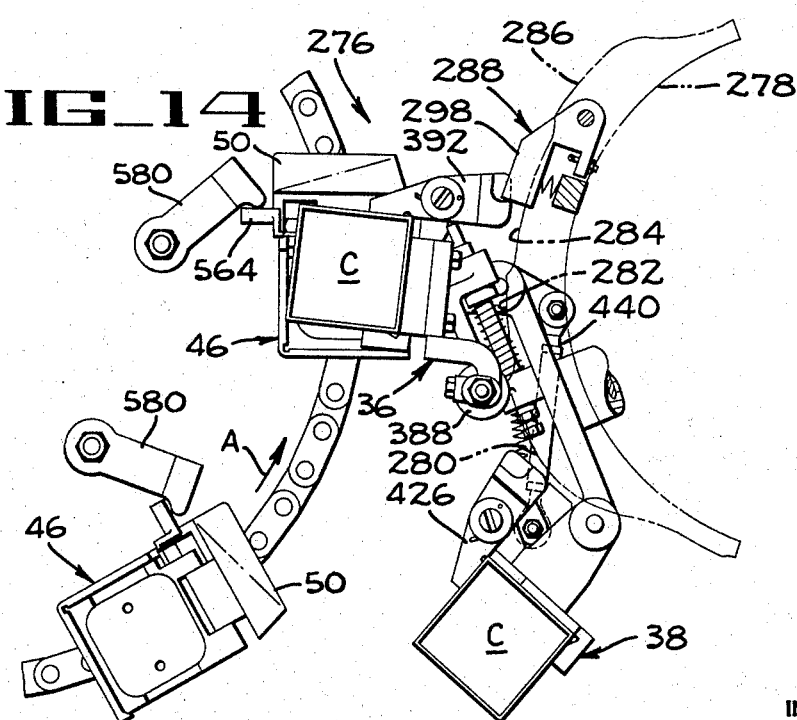
INVENTORS
JOHN STEVENSON, JR.
ROBERT E. TAGGART
BY Francis W. Anderson
ATTORNEY April 16, 1968 J. STEVENSON, JR., ET AL 3,378,128
CARTON TRANSFER APPARATUS
Filed July 8, 1966 17 Sheets-Sheet 11
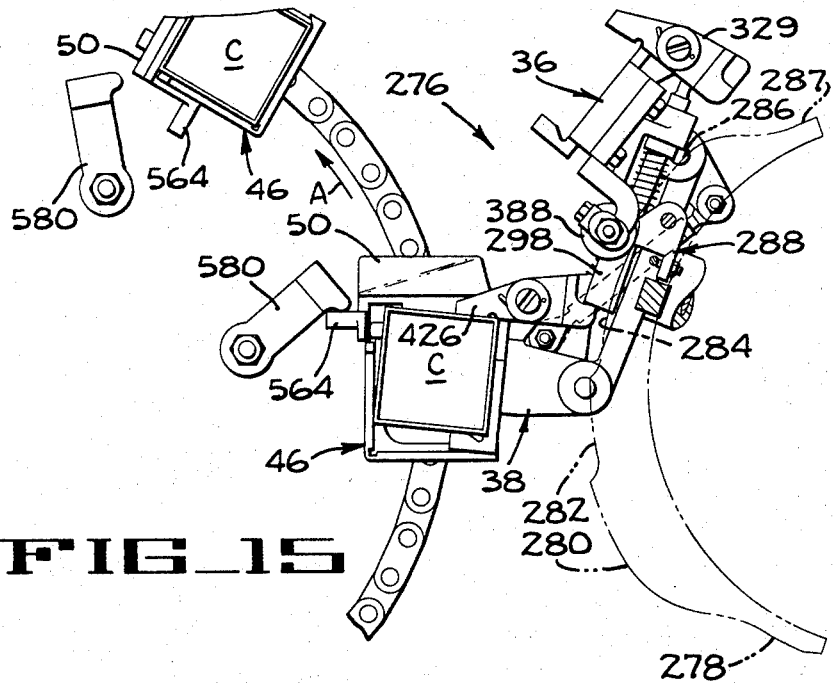
FIG_15
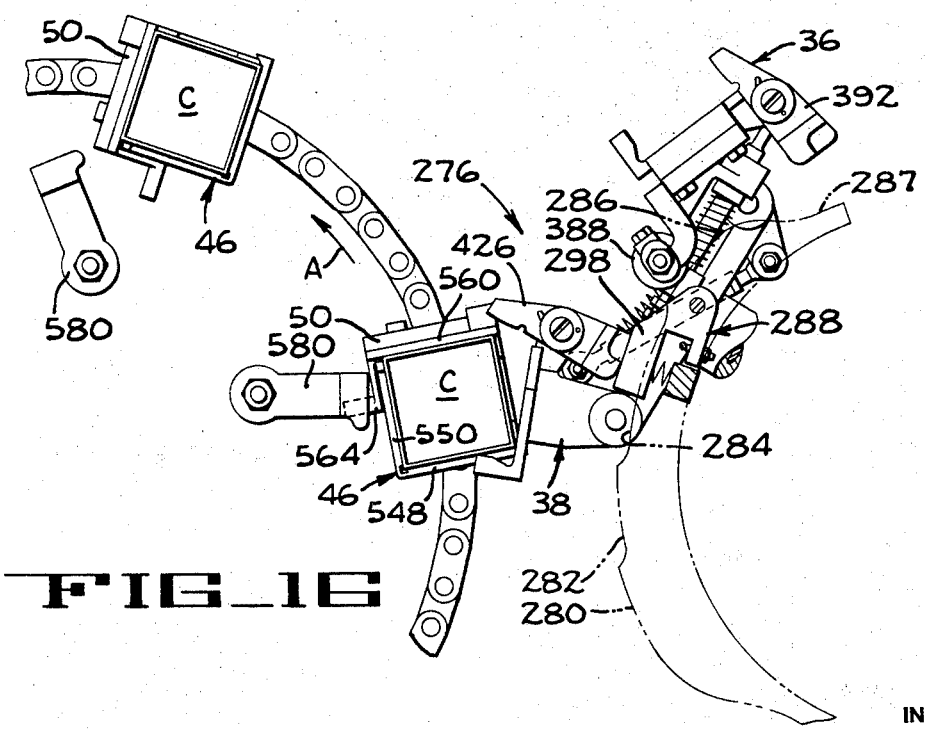
FIG_16
INVENTORS
JOHN STEVENSON, JR.
ROBERT E. TAGGART
BY Francis W. Anderson
ATTORNEY

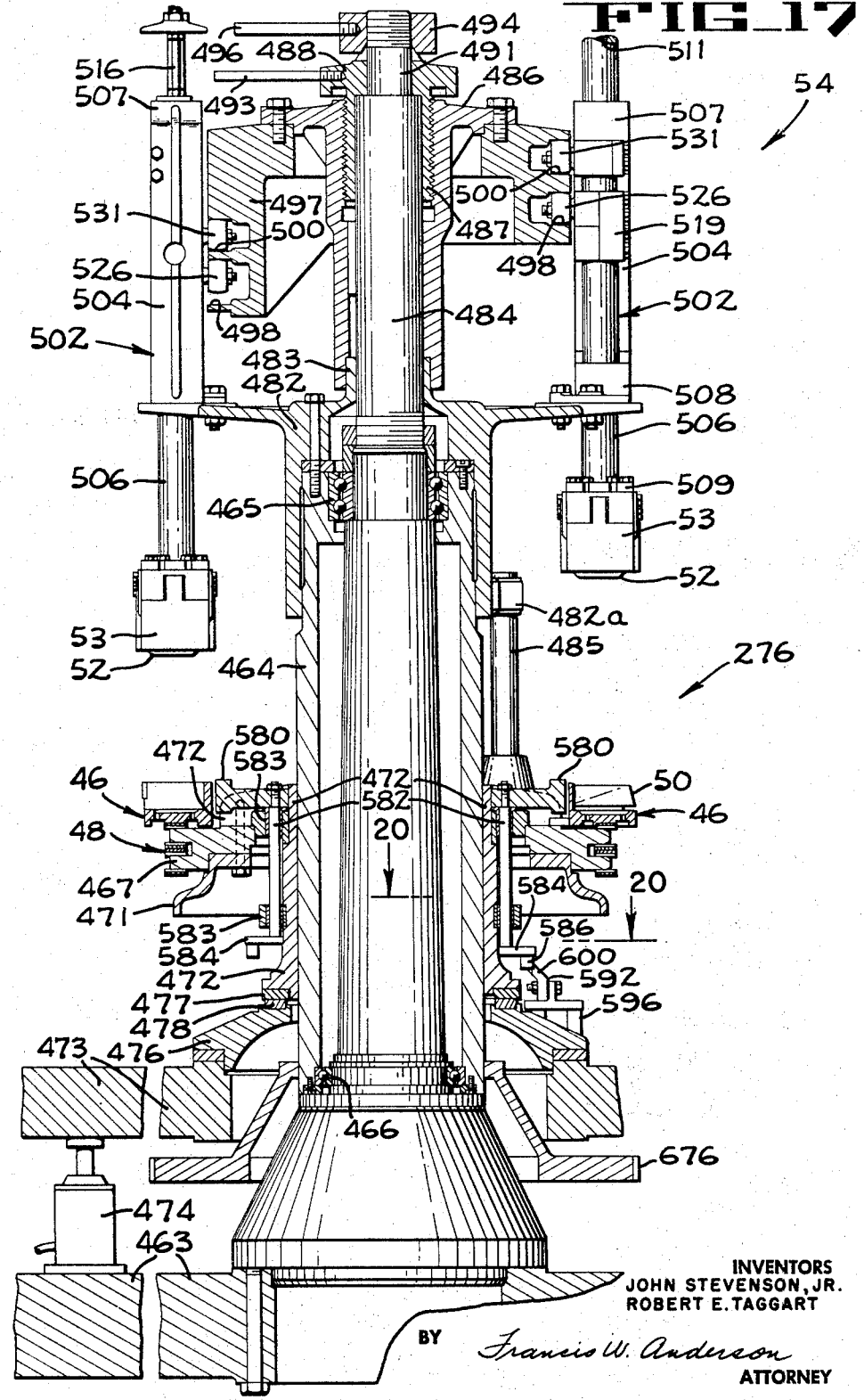

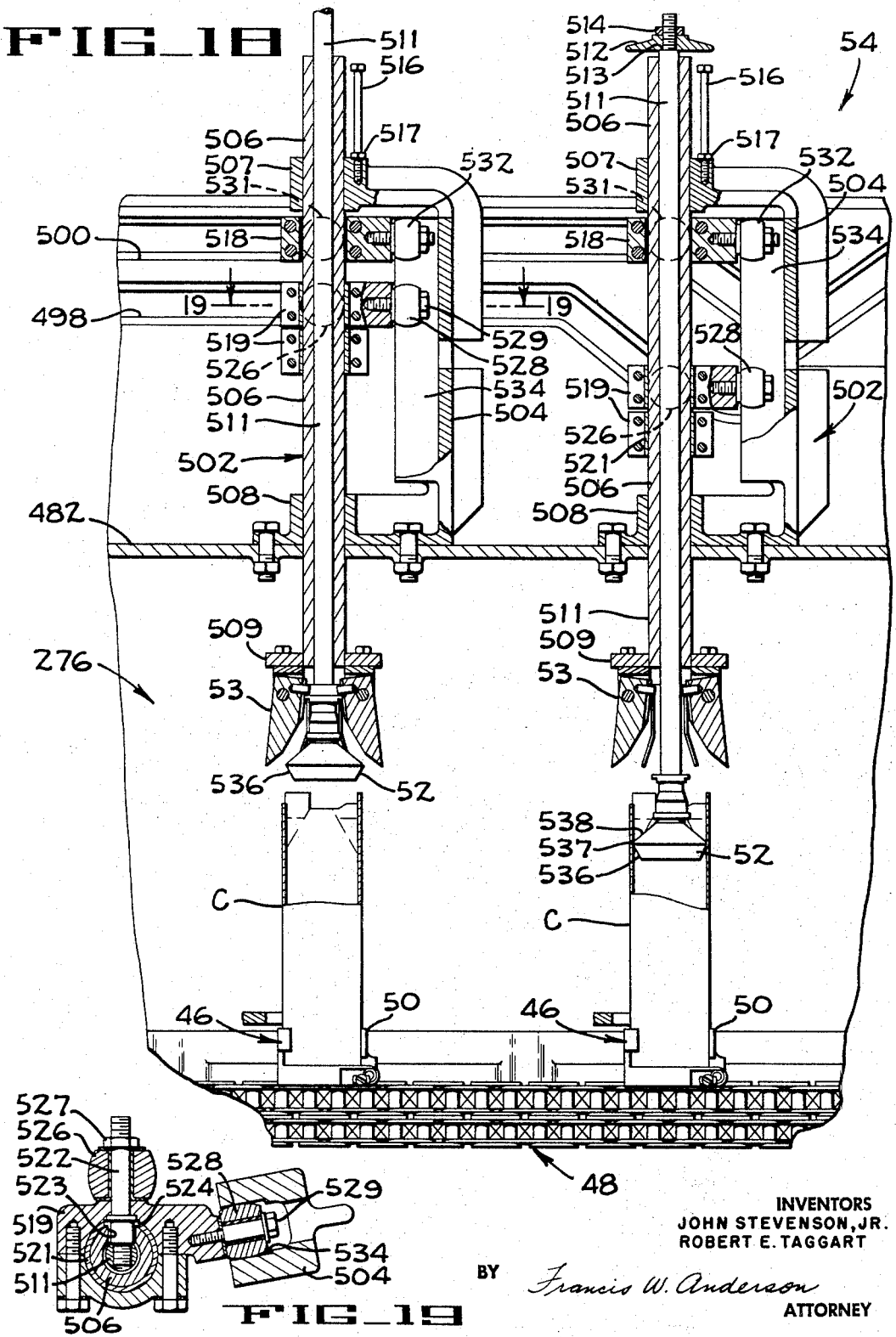

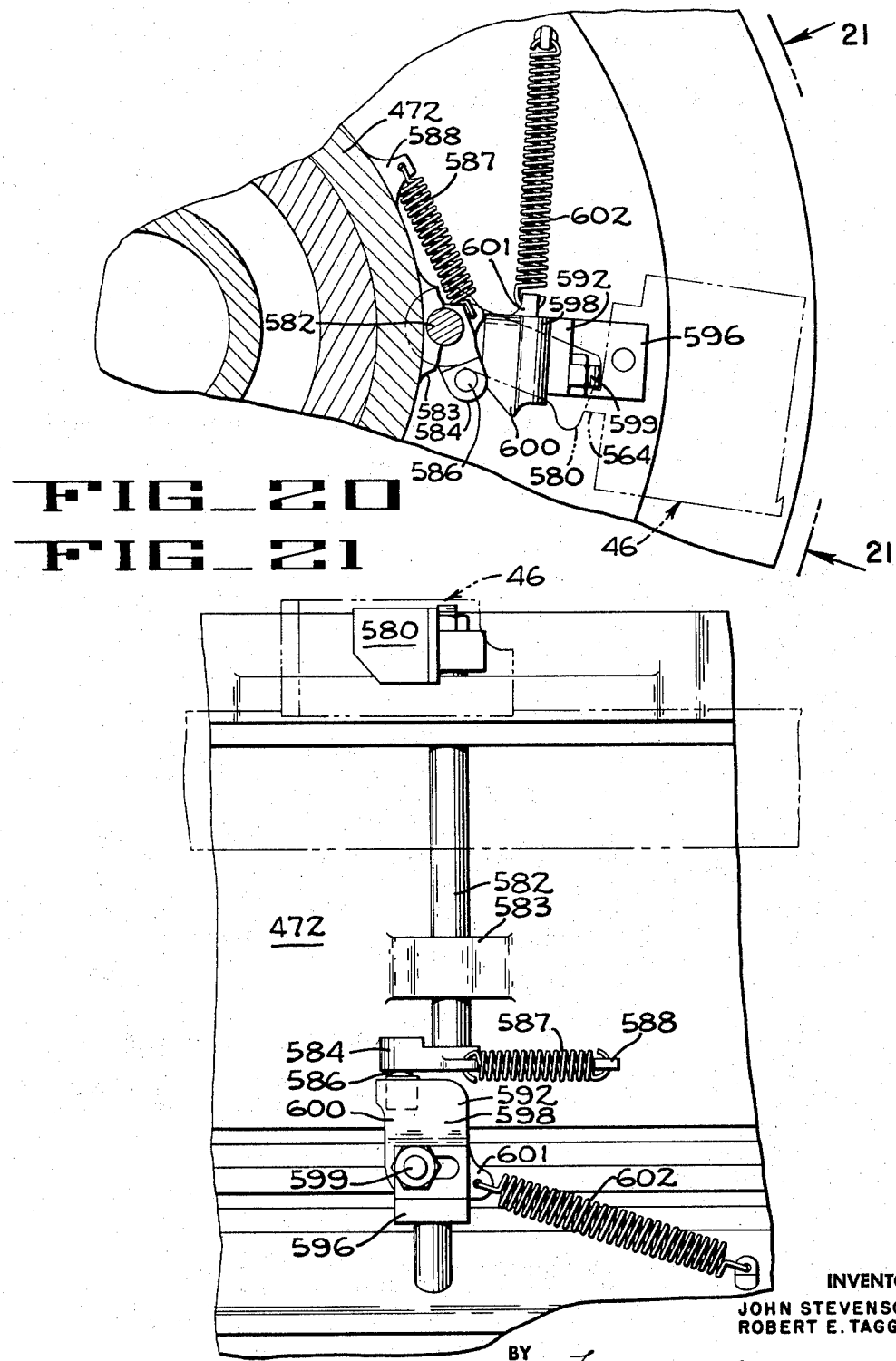

April 16, 1968   J. STEVENSON, JR., ET AL   3,378,128
CARTON TRANSFER APPARATUS
Filed July 8, 1966   17 Sheets-Sheet 15
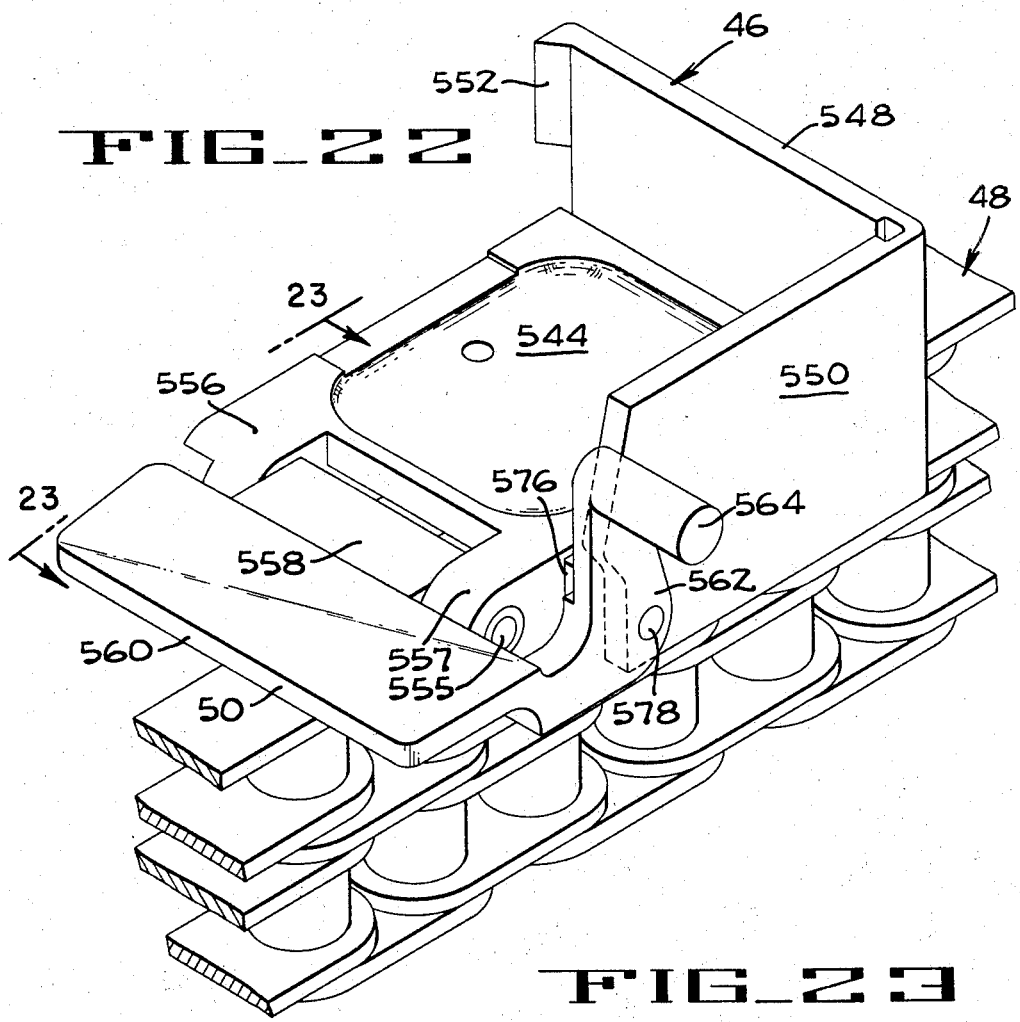
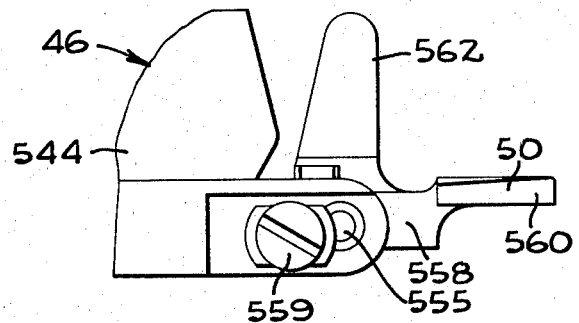
INVENTORS
JOHN STEVENSON, JR.
ROBERT E. TAGGART
BY *Francis W. Anderson*
ATTORNEY

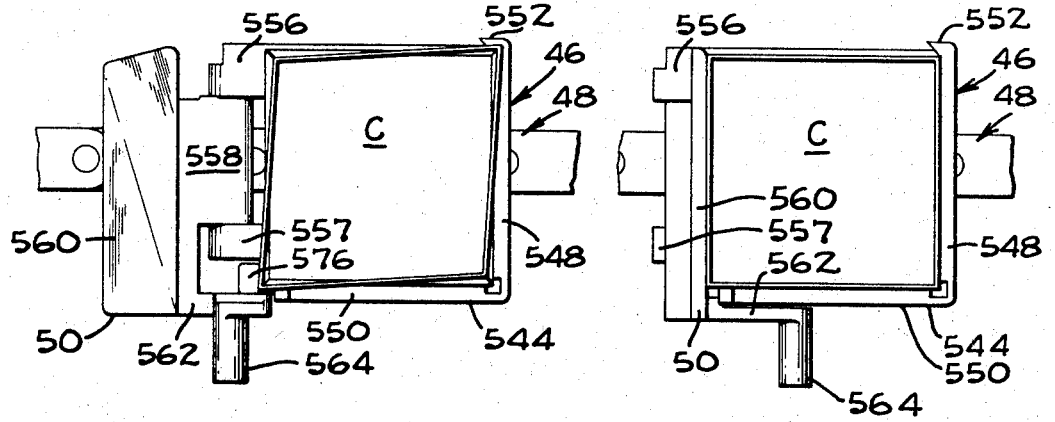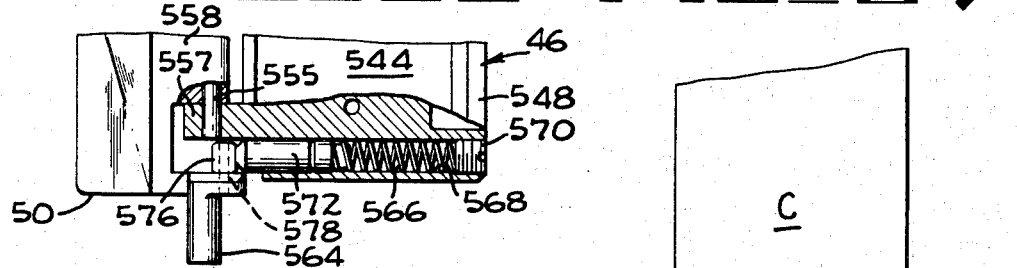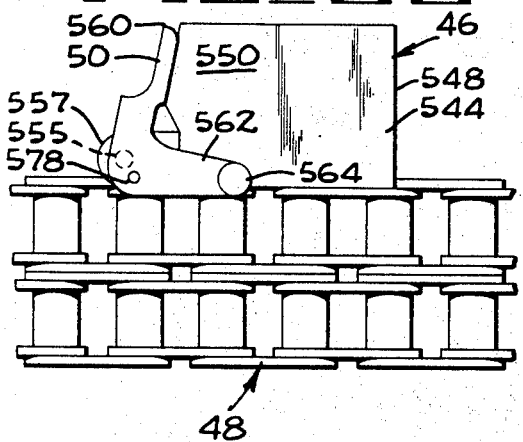

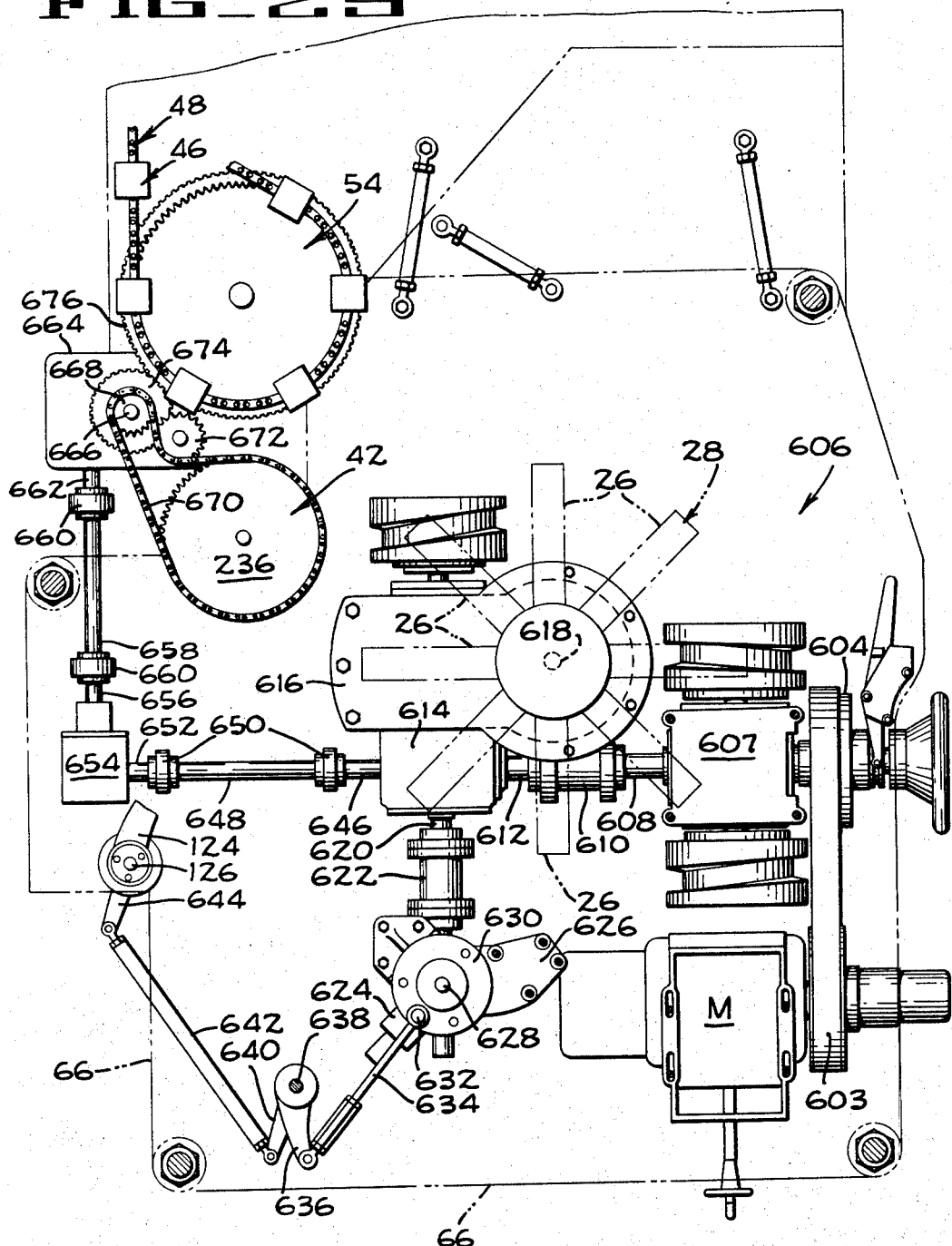

3,378,128
CARTON TRANSFER APPARATUS
John Stevenson, Jr., Saratoga, Calif., and Robert E. Taggart, Wilton, Conn.; said Stevenson, Jr., assignor to FMC Corporation, San Jose, Calif., a corporation of Delaware, and said Taggart assignor to American Can Company, New York, N.Y., a corporation of New Jersey
Filed July 8, 1966, Ser. No. 563,875
22 Claims. (Cl. 198—20)

ABSTRACT OF THE DISCLOSURE

An apparatus which simultaneously receives cartons from two rows of cartons spaced a predetermined distance apart and supported by intermittently driven mandrels and transfers the cartons one at a time into carton gripping carriers on a continuously driven endless conveyor moving along a single path without releasing gripping control of the cartons during transfer. The carriers are spaced apart a distance which is different from the predetermined distance, and the cartons are rotated from a horizontal to a vertical position while being spaced a distance apart equal to that of the carriers during transfer from the mandrels to the carriers.

---

The present invention pertains to packaging equipment and more particularly relates to an apparatus for withdrawing two rows of cartons having their bottom closures sealed from two parallel series of intermittently driven mandrels, and transferring the two rows of cartons into evenly spaced carriers of a single continuously driven conveyor.

The carton transfer apparatus of the present invention is intended for use in a carton forming and filling machine of the type disclosed in the copending U.S. Vadas et al. application, Ser. No. 461,738 which application was filed on June 7, 1965 and is assigned to the assignee of the present invention.

In the machine disclosed in the Vadas et al. application, an accumulator was provided between the intermittently driven bottom sealing section of the machine and the continuously driven filling section of the machine thus permitting the two sections of the machine to operate independently of each other. It has been determined that for certain applications of the machine the accumulator is not essential, and accordingly, the carton transfer apparatus of the present invention may be substituted for the accumulator and is provided so as to directly transfer two rows of cartons from the bottom sealing section to the singe row of cartons accommodated by the filling section.

The direct transfer apparatus includes structure for retaining complete control of each carton from the moment the carton is stripped from its mandrel until after the carton has been placed in and has been gripped at its lower end by its associated carrier. The upper end of the carton is then stabilized by an anvil inserted into the carton. Such complete control of the carton adapts the machine for high speed, trouble free operation without danger of losing control of the cartons during transfer.

It is therefore one object of the present invention to provide a carton transfer apparatus capable of retaining complete control of a carton between the time it is released from one processing section and is accepted by another processing section.

Another object is to provide a carton transfer apparatus for gripping cartons disposed in two rows and releasing them in carriers in a single row.

Another object is to provide a carton transfer apparatus which receives cartons from two rows and transfers them directly into a single row at a high rate of speed.

Another object is to provide a carton transfer apparatus which receives cartons from two rows spaced a predetermined distance apart and transfers the cartons into carriers disposed in a single row and spaced a different distance apart.

Another object is to provide a direct transfer apparatus for simultaneously gripping two horizontally disposed cartons spaced a predetermined distance apart, and for twisting the cartons into upright positions before releasing the cartons in upright position in spaced carriers movable along a single path.

Another object is to provide a direct transfer apparatus for gripping cartons stripped from mandrels prior to release of the cartons from the mandrel stripping mechanism.

Another object is to provide a direct transfer apparatus for presenting the cartons in upright position to carriers which grip the cartons prior to their release by the transfer apparatus.

Another object is to provide a carton transfer apparatus for gripping horizontally disposed cartons, for twisting the cartons into vertical positions, for presenting the cartons into positions to receive upper stabilizing means, and for placing the cartons in carriers which grip the lower ends thereof and stabilizes the cartons prior to release of the cartons by the transfer apparatus.

These and other objects and advantages of the present invention will become apparent from the following description and the accompanying drawings, in which:

FIGURE 1 is a plan illustrating the relationship of the several turrets associated with a carton transfer turret, which turrets cooperate to define the carton transfer apparatus of the present invention, certain parts being cut away and others being shown in phantom.

FIGURE 2 is a side elevation of the apparatus of FIGURE 1 looking in the direction of arrows 2—2 of FIGURE 1.

FIGURE 3 is an enlarged horizontal section taken along lines 3—3 of FIGURE 2 illustrating a mandrel stripping mechanism in a retracted position and with the transfer turret withdrawing a carton therefrom.

FIGURE 4 is an end elevation of the apparatus of FIGURE 1 looking in the direction of arrows 4—4 of FIGURE 1, the mandrel stripping mechanism being shown in a retracted carton unloading position.

FIGURE 5 is an enlarged vertical section taken along lines 5—5 of FIGURE 3 illustrating the manner in which a pair of stripper fingers grip a carton before the carton is pulled free therefrom by the transfer turret, certain parts being cut away.

FIGURE 6 is an enlarged vertical section taken along lines 6—6 of FIGURE 4 illustrating the relationship between the mandrel stripping mechanism and the unloading trough.

FIGURE 7 is an enlarged vertical section taken along lines 7—7 of FIGURE 1 illustrating the relationship between the unloading mechanism and the mandrel stripping mechanism.

FIGURE 8 is a diagrammatic elevation illustrating the manner in which an unsynchronized mandrel deflects a stripper finger out of its path of movement.

FIGURE 9 is a vertical section of the transfer turret taken substantially along the lines 9—9 of FIGURE 1 but with one of the transfer heads being positioned at the pickup station.

FIGURE 10 is an exploded perspective of one of the transfer heads.

FIGURE 11 is an enlarged vertical section taken along lines 11—11 of FIGURE 9.

FIGURE 12 is an enlarged horizontal section taken along lines 12—12 of FIGURE 9 illustrating the apparatus for opening the jaws of the transfer heads at a discharge station.

FIGURE 13 is an operational view illustrating in plan the leading transfer jaw moving a carton into a carrier.

FIGURE 14 is a view similar to FIGURE 13 but illustrating the leading jaw immediately before it moves the carton into exact registration with the associated carrier and immediately before the carrier gate is closed and the jaw is opened.

FIGURE 15 is a view similar to FIGURE 13 but illustrating the following jaw immediately before transferring the carton between the jaw and its associated carrier.

FIGURE 16 is a plan of the following jaw immediately after the carton has been released by the jaw and has been gripped by the associated carrier.

FIGURE 17 is an enlarged vertical central section of the forming turret taken along lines 17—17 of FIGURE 1.

FIGURE 18 is an arcuate section of the forming head taken substantially along lines 18—18 of FIGURE 1.

FIGURE 19 is an enlarged vertical section taken along lines 19—19 of FIGURE 18.

FIGURE 20 is an enlarged horizontal section taken substantially along lines 20—20 of FIGURE 17, certain parts above the plane of section being indicated in phantom.

FIGURE 21 is an arcuate section taken along lines 21—21 of FIGURE 20 illustrating the means for closing the gates of the carriers, a carrier being shown in phantom with its gate closed.

FIGURE 22 is an enlarged perspective of one of the carriers with the gate being open.

FIGURE 23 is an elevation of a portion of the carrier looking in the direction of arrows 23—23 of FIGURE 22.

FIGURE 24 is a plan of a carrier with its gate open and with a carton seated therein, said view illustrating the diamond shaped configuration the top of the carton will assume if the carton is not gripped by the carrier before released by the transfer jaws.

FIGURE 25 is a plan similar to FIGURE 24 but showing the carrier gate closed and the carton held thereby in a squared configuration.

FIGURE 26 is a plan of a fragment of the carrier with parts broken away to illustrate resilient means for maintaining the gate in adjusted position.

FIGURE 27 is an elevation illustrating a carrier with its gate closed against a carton.

FIGURE 28 is an elevation with the gate closed and in the empty carrier position.

FIGURE 29 is a diagrammatic plan illustrating the drive mechanism for the carton transfer apparatus of the present invention.

In general, the carton transfer apparatus 20 (FIGS. 1 to 4) of the present invention receives two rows of cartons C with their bottom closures sealed from an upper series 22 and a lower series 24 of mandrels 26 which are supported by and are rigidly secured to an intermittently driven bottom forming turret 28. A reciprocable mandrel stripping mechanism 30 simultaneously grips cartons from one of the upper and from one of the lower mandrels 26, strips the gripped cartons free from the mandrels, and moves the cartons onto an unloading trough 32. Before the stripped cartons are released by the stripping mechanism 30, the cartons are simultaneously gripped by an upper jaw 36 and a lower jaw 38 of one of a plurality of transfer heads 40 of a continuously driven transfer mechanism which, in its preferred form, is a turret 42. The upper jaw 36 and the lower jaw 38 receive cartons which are horizontally disposed and are spaced a predetermined distance apart, and simultaneously remove them from the unloading trough 32. The associated transfer head 40 then pivots the cartons from a horizontal to a vertical position while at the same time spacing the two cartons from each other a distance which is different from that of said predetermined distance. The transfer jaws 36 and 38 then place the cartons into spaced carriers 46 which are mounted on a single continuously driven conveyor 48 and include pivotal gates 50 which firmly clamp the lower end of each carton in its associated carrier. After the cartons have been gripped by the associated carriers 46, the jaws 36 and 38 of the associated transfer head 40 are opened in turn thereby releasing the two cartons for movement along the single path of the conveyor 48. A pair of anvils 52, which are each associated with a forming head 53 of a forming turret 54, are then simultaneously lowered into the open upper ends of the two cartons thus stabilizing the upper ends thereof while the jaws of the transfer head 40 return to grip another pair of cartons from the unloading trough 32.

More particularly, the cartons C, which are supported on the particular mandrels 26 of the upper series 22 and lower series 24 that are indexed at a mandrel unloading station 56, are stripped from the two mandrels by the mandrel stripping mechanism 30 which is driven in timed relation with the bottom forming turret 28. The bottom forming turret 28 is fully described in the previously mentioned Vadas et al. application and, accordingly, will not be described in detail herein except to state that the upper series 22 and lower series 24 of mandrels 26 are spaced a predetermined distance apart, the preferred center-to-center distance being 6 inches.

The mandrel stripping mechanism 30 is disclosed and claimed in a copending application of Francis Hoff, Ser. No. 563,838, which application was filed on even date herewith.

The mandrel stripping mechanism 30 (FIGS. 1–8) comprises a carrier 58 which is slidably received on a pair of parallel rods 60 and 62 which are rigidly secured to brackets 64 that are bolted to the frame 66 of the machine. The carrier 58 includes a horizontal base 68 having collars 70 and slide blocks 71 (FIG. 7) formed thereon and slidably supported on the rods 60 and 62, respectively. An upstanding finger supporting member 72 is integral with the base 68 and includes three spaced horizontal finger supporting arms 73 (FIGS. 4–6) which define horizontal slots 74 and 76 to permit the upper series 22 and lower series 24, respectively, of mandrels 26 to pass therethrough in the event the forming turret 28 and mandrel stripping mechanism 30 should become improperly timed.

Each carton is engaged by an upper stripper finger 78 of upper stripper finger assemblies 82 and 84 (FIGS. 4 and 6), and by a lower stripper finger 80 of lower stripper finger assemblies 86 and 88. The assemblies are substantially the same except that the upper stripper fingers 78 (FIG. 5) are shorter than the lower stripper fingers 80 so as to engage carton end closure flaps F1 and F2 respectively, which are of different lengths. Also, the upper fingers 30 are resiliently urged to pivot in a clockwise direction (FIG. 5) while the lower fingers are urged to pivot in a counterclockwise direction. Because the stripper finger assemblies 82, 84, 86 and 88 are so similar, only the assembly 82 will be described in detail.

The stripper finger assembly 82 (FIGS. 5, 6 and 8) comprises a shaft 90 journalled in a suitably bushed hub 92 formed on the free end of the upper finger supporting arm 73 and held from axial movement relative thereto by a large diameter portion 94 near one end, and a washer 96 and nut 98 screwed on the other end. A torsion spring 100 is wound around the large diameter portion of the shaft 90 and has one end connected thereto. The other end of the spring is connected to the hub 92 thereby urging the shaft 90 to pivot in a clockwise direction (FIG. 5).

The central portion 102 (FIG. 6) of the shaft 90 is of rectangular cross-section and is engaged by a stop bolt 104 screwed into the hub 92 and locked in desired position by a locknut 105 thereby limiting the amount of spring-urged pivotal movement permitted of the shaft.

The upper stripper finger 78 (FIGS. 6 and 8) is internally slotted at 106 to receive a rectangular end portion of the shaft 90 and is connected to the rectangular portion by a pivot pin 108. The pivot pin connection causes rotation of the finger 78 with the shaft 90 about the longitudinal axis thereof, and also permits pivotal movement of the finger 78 about the axis of the pivot pin 108 as indicated in FIGURE 8 in the event the bottom forming turret 28 is improperly timed relative to the stripping mechanism 30 and causes a mandrel 26 to contact the finger 78 when moving into the unloading station 56.

A notch 110 is formed in the end of the shaft 90 and is engaged by the ball 112 of a ball detent 114 which is screwed into the finger 78. Thus, the finger 78 is normally held in the operative position by the ball detent 114 but may be shifted out of this position without damage to the finger 78, if one of the mandrels 26 of the bottom forming turret 28 should swing laterally against the associated finger 78 or 80. Under such circumstances, it is apparent that the upper fingers will pivot in a counterclockwise direction (FIG. 6) about their pins while the lower fingers will pivot in clockwise direction.

As best shown in FIGURE 5, the free ends of each cooperating upper and lower pair of fingers 78 and 80 are provided with outwardly diverging slots 116 and 118, respectively, which slots receive and firmly grip the top closure flaps F1 and F2 during the mandrel stripping operation and retain their grip until after the cartons have been received and gripped by the jaws 36 and 38 of the transfer turret 42. It will be understood that the slots 116 and 118 grip the cartons with a sufficient force to not only reliably hold the cartons in position to be received by the associated jaws, but also maintain the flaps which define the open end of each carton in a square condition rather than permitting the open end to be forced into a diamond shape by inherent resilience in the walls of the carton.

The carrier 58 is reciprocated by a lever 124 (FIGS. 1, 2 and 4) which is secured to a shaft 126 that is pivoted in timed relation with the movement of the bottom forming turret 28 by means to be fully described hereinafter. In this regard, one end of a link 128 is pivotally connected to the carrier 58 and has its other end pivotally connected by a bolt or pin 130 (FIG. 1) to one of our openings 132, 134, 136 and 138 formed in the lever 124 depending upon whether quart, pint, one-third quart or one-half pint size cartons, respectively, are being handled. It will be understood that a carton stop 140 on each mandrel 26 will also be adjusted to accommodate the particular size of carton being handled as fully disclosed in the Vadas et al. application.

Pivotal movement of the shaft 126 is a clockwise direction (FIG. 1) causes the carrier 58 to move from the carton unloading position to the illustrated carton receiving position during which time the upper fingers 78 pivot in a counterclockwise direction (FIG. 5) and ride over the upper surface of the carton on the associated mandrel 26, and the lower fingers 80 pivot in a clockwise direction and ride across the lower surface of the carton on the associated mandrel 26. When the fingers 78 and 80 reach the carton receiving end of their stroke, they snap into receiving position under the influence of the torsion springs 100. The free ends of the fingers are, at this time, received in longitudinally extending slots 142 formed in the upper and lower surfaces of the mandrels 26, which slots extend the full length of the mandrels. Pivotal movement of the shaft 126 in the opposite or counterclockwise direction (FIG. 1), then causes the fingers 78 and 80 to move to the left (FIG. 1) thereby first seating carton flaps F1 and F2 in firm gripping engagement in the finger slots 116 and 118, respectively, as illustrated in FIGURE 6 and thereafter stripping the cartons off the upper and lower mandrels at the unloading station 56 for acceptance by the unloading trough 32 in position to be engaged and gripped by the jaws 36 and 38 of the transfer turret 42.

The unloading trough 32 (FIGS. 3, 4, 6 and 7) comprises upstanding brackets 146, 148 and 150 which are bolted to the frame 66 and have an upper track 152 and a lower track 154 bolted thereto. The upper track 152 is disposed at the unloading station 56 in position to receive cartons stripped from the upper mandrels, and the lower track 154 is positioned to receive cartons stripped from the lower mandrels.

Each of the tracks 152 and 154 includes a short angle slide plate 156 (FIG. 3) having an arcuate end 158 for accommodating the transfer heads 40 of the transfer turret 42 as they move in a circular path therepast. Each angle slide plate 156 is bolted to the bracket 146 and cooperates with a guide rod 160 welded to the bracket 146 to receive and support one edge of the associated cartons. Each track also includes a long slide plate 162 which is bolted to the brackets 148 and 150 and includes a horizontal inlet section 164 that is spaced from the short angle slide plate 156 to permit the associated lower stripper finger 80 to pass therebetween. An arcuate section 166 of each long slide plate 162 is concentric with the arcuate end 158 of the short plate 156 for accommodating the transfer heads 40 and a vertical upstanding wall 168 is welded to the inlet section 164 and guides the cartons into a transfer turret pickup station 170 which is at the arcuate portions of the tracks 152 and 154.

A carton stopping and guiding unit 172 (FIGS. 3 and 7) is disposed at the downstream end of the unloading trough and includes a pair of apertured guide blocks 174 and 176 which are slidably received on horizontal rods 178 and 180 that are secured in bosses 182 and 184 (FIG. 4) formed in the bracket 150. The guide blocks 174 and 176 are interconnected by a vertical plate 186 bolted thereto, and are apertured to pivotally receive a vertical stop arm actuating shaft 188. An upper stop arm 190 and a lower stop arm 192 are setscrewed to the shaft in position to engage an edge of the bottom closure of each carton moved into the pickup station 170 on the upper track 152 and on the lower track 154, respectively. A collar 194 is secured to the shaft 188 to prevent vertical movement thereof, and a torsion spring 198 is connected between the collar 194 and the guide block 174 thereby normally urging the shaft 188 and stop arms 190 and 192 to pivot in a clockwise direction as indicated in FIGURE 3. A downwardly extending cam pin 200 is setscrewed to the upper arm 190 and bears against one edge of the upper track 152 to limit the clockwise pivotal movement of the stop arms.

As indicated in FIGURE 3, the stop arms 190 and 192 have concave carton engaging surfaces 202 which are concentric with the transfer turret 42 and with the arcuate sections 158 and 166 of the tracks 152 and 154 which serve the double function of stopping the linear movement of each associated carton in the pickup station 170 by contacting one corner of the bottom closure of the carton, and also retains slidable engagement with this corner during withdrawal of the carton from the pickup station by the transfer turret 42. Thus, the arcuate surface of each stop arm serves to stop the linear movement of the carton in pickup position and also prevents the closed ends of the carton from swinging radially outward during angular acceleration of the carton out of unloading trough by the transfer turret 42.

In order to accommodate quart, pint, one-third quart and one-half pint cartons, the carton stopping and guiding unit 172 is adjusted horizontally along the rods 178 and 180, and is locked in adjusted position by a self-locking pin 204 which is inserted in a hole 206 in the guide block 174 and through holes 208, 210, 212 and 214, respectively, in the rod 178. Adjustment of the unit 172 as above described causes the cam pin 200 to engage camming surfaces 216, 218, 220 and 222, respectively, thereby retaining the concave carton engaging surfaces 202 of the stop arms 190 and 192 substantially concentric with the axis of the transfer turret 42 when handling each of the four sizes of cartons.

The transfer turret 42 (FIGS. 3 and 9) comprises a stationary column 230 that is bolted to the frame 66 and projects upwardly therefrom through a rotatable tubular column 232 journalled thereon by upper and lower bearings 234. A turret drive sprocket 236 is bolted to the lower end of the rotatable column 232 and is continuously driven in a clockwise direction (FIG. 3) by means to be described hereinafter. Four equally spaced apertured bosses 238 (FIG. 3) are formed on the rotatable column 232 and each boss receives one of the transfer heads 40, only two heads being shown in FIGURE 3.

A cam supporting hub 240 is disposed at the upper end of the stationary column 230 and is bolted to an annular cam 242 having a vertically undulating cam track 244 therein. The cam 242, and accordingly the cam supporting hub 240, is rigidly connected to the stationary column 230 by a taper lock bushing 246 which is keyed to the column 230. The cam supporting hub 240 is locked in desired vertical position by a lock bushing 248 which is screwed into the hub 240 and onto one end of a threaded rod 252 having an enlarged hexagonal central section 254. As illustrated in FIGURE 9, the bushing 248 abuts the upper end of the stationary column 230 and is then locked in position by tightening the hexagonal central section 254 against the upper end thereof.

An arcuate, jaw opening trip rod 264 is welded to upstanding supporting arms 266 which are received and locked in vertical openings in a mounting bracket 270 bolted to the cam supporting hub 240 adjacent the pickup station 170.

An arcuate, downwardly extending cam supporting bracket 274 is bolted to the hub 240 adjacent a carton discharge station 276 and has a jaw spacing cam 278 formed on the lower end thereof. As will be described in more detail hereinafter, cam 278 includes a first arcuate portion 280 which separates the centers of the jaws 36 and 38 approximately 10 inches from each other and causes a carton carried in the jaw 36 to enter the associated carrier 46 as indicated in FIGURE 13, a second arcuate portion 282 which separates the jaws a lesser amount and moves the carton in the jaw 36 rearwardly relative to the carrier so that the carton will register with the walls of the associated carrier 46. FIGURE 14 illustrates the position of the carton immediately before the arcuate portion 282 gains control of the position of the jaw 36. A third arcuate portion 284 of the cam 278 permits the jaws to move still closer together permitting the carton in the jaw 38 to enter the associated carrier 46 as illustrated in FIGURE 15, a fourth arcuate portion 286 which again separates the jaws to permit the jaw 38 to clear the carton which it has released in its associated carrier as indicated in FIGURE 16, and a terminal portion 287 which permits the jaws to return to their normal 6 inch spacing.

As indicated in FIGURES 9 and 12, a gripping finger trip device 288 is bolted to the lower end of the bracket 274 adjacent the discharge station 276. The device 288 comprises an arcuate support plate 290 having threaded studs 292 and 294, and a stop plate 296 projecting downwardly therefrom. A trip finger 298 is pivoted on the stud 292 and is held in place by a nut (not shown) screwed thereon. The trip finger 298 is urged radially outwardly from the center of the turret by a compression spring 302, which spring is disposed between the finger 298 and the stop plate 296. As indicated in FIGURE 12, the stud 294 is received in a notch 308 in the trip finger 298. An adjustment bolt 310 screwed into the finger 298 is disposed in position to engage the stud 294 thereby providing means for limiting the outward movement of the finger 298.

Although the spring 302 is ineffective during normal operation, if the turret 42 is rotated in a direction opposite to its normal direction of movement during maintenance for example, a sloping surface 305 of the trip finger 298 will be contacted and deflected inwardly by the transfer jaws 36 and 38 thus permitting the jaws to move therepast without injury.

As mentioned previously, each transfer head 40 is rotated 90 degrees about a horizontal axis during the transfer operation so that a pair of vertically spaced, horizontally disposed cartons may be gripped at the pickup station 170 and can be shifted to horizontally spaced vertically disposed positions while being transferred to the discharge station 276.

In order to rotate each transfer head 40 about a horizontal axis through an arc of 90°, a vertically extending rack 311 (FIGS. 9 and 11) is formed on a shaft 312 having a cam follower 314 journalled on its upper end, is associated with each head. The cam follower 314 of each rack 311 is received in the cam track 244 and is guided for vertical reciprocation in collars 316 and 318 formed an opposite ends of a bracket 320 which is bolted onto the rotary column 232. Gear teeth of the rack 311 are received in meshing engagement with a gear segment 324 of the associated transfer head 40. Thus, vertical movement of each shaft 312 by the cam track 244 during rotation of the turret 42 between the pickup station 170 and discharge station 276 will cause the associated transfer heads 40 to pivot 90° from a vertical to a horizontal position. In order to prevent each of the shafts 312 (FIGS. 9 and 12) from rotating relative to its supporting bracket 320, a yoke 326 is bolted to the shaft 312 and has a cam follower 328 journalled thereon and disposed in position to ride in a vertical groove 330 formed in the bracket 320.

Since all of the transfer heads 40 are identical, only one head will be described in detail. As best shown in FIGURES 3, 9 and 10, each transfer head 40 comprises a main support body 336 to which one of the gear segments 324 is rigidly secured by bolts, and to which the upper jaw 36 and the lower jaw 38 are pivoted.

The main support body 336 is suitably bushed and is rotatably mounted on a sleeve 338 which projects into a counter bore in the associated boss 238 of the rotary column 232. The sleeve 338 is clamped in place by an elongated bolt 340 screwed into the boss 238 and a cooperating flat washer 342 and lock washer 344. Sufficient clearance is provided between the washer 342 and the outer end of the boss 238 to freely accommodate the body 336 and a pair of thrust washers and thereby permitting free rotation of the body 336 about the axis of the bolt 340 in response to vertical reciprocable movement of the rack 311.

The main body 336 comprises a bored upper hub 350 (FIG. 10) which has a pivot shaft 352 secured therein by a lock bolt with both ends of the shaft projecting outwardly from the hub 350. Similarly, a lower hub 356 is formed on the other end of the body 336 and has a pivot shaft 358 secured thereto by a lock bolt 360 so that both ends of the shaft project outwardly from the hub 356.

A bracket defining a pair of aligned concentric hubs 362 and 364 is formed integrally with the body 336 adjacent the hub 350 with the axis thereof being at right angles to the axes of both pivot shafts 352 and 358. A finger opening rod 366 having a reduced diameter end portion 367 is slidably received in the hubs 362 and 364 and has a collar 368 setscrewed thereto and normally urged toward the left (FIG. 10) by a compression spring 370 which is disposed between the collar 368 and the hub 364. A cap screw 372 is screwed into one end of the finger opening rod 366 and is locked in place by a lock nut 374 thereby providing means for varying the effective length of the rod 366, which as will be described hereinafter, is effective to transmit a jaw opening force from the upper jaw 36 to the lower jaw 38 when the jaws are disposed in the pickup station 170.

The upper jaw 36 includes a body 378 of cast construction having a flat face 380 for receiving the upper portion of one wall of a carton, an end wall 381 integral with and projecting outwardly from the face 380 for engaging the upper edge of said one carton wall, and a fixed side wall 382 integral with and projecting outwardly from the face 380 for engaging one longitudinal edge of said one carton side wall. A yoke 384 is integral with the body 378 and is pivoted upon the projecting ends of the pivot shaft 352. The yoke 384 also includes an extension in the form of a lever arm 385 which projects outwardly beyond the pivot shaft 352. An irregularly shaped arm 386 is bolted to the body 378 and has a cam follower 388 journalled on a bolt 389 which is received in a slot in the arm 386 and is locked in desired position of adjustment by a bolt and locknut 390. As indicated in FIGURES 13–16, the cam follower 388 is positioned to rid along the camming surfaces of the jaw spacing cam 278 when the jaws are moved into the discharge station 276.

As best shown in FIGURE 10, a carton gripping finger 392 is pivotally connected to an ear 393, that is integral with and projects outwardly from the body 378, by a shaft 394 that is screwed into the ear and is locked in place by a nut 396. A large diameter ring 398 is rigid with the shaft 394 and is spaced sufficiently from the finger 392 to permit free pivotal movement of the finger. A torsion spring 400 is disposed between the ring 398 and a collar 402 that is setscrewed to the shaft. The torsion spring 400 has one end secured to the collar 402 and the other end secured to the shaft so as to normally pivot a carton gripping end portion 404 of the gripping finger 392 into carton gripping position illustrated in FIGURE 11.

The carton gripping finger 392 includes the carton gripping end portion 404 and an actuating portion 406 which includes a trip finger engaging portion 408 that projects laterally upward as indicated in FIGURE 10 from the longitudinal axis of the gripping finger 392. The trip finger engaging portion 408 is provided with a slot 410 (FIGS. 10 and 12) positioned to receive the trip finger 298 and to be deflected thereby when the gripping finger moves into the discharge station 276 thereby opening the upper jaw 36 and releasing the carton supported thereby. The actuating portion 406 of the gripping finger 392 also includes a slot 414 for receiving the reduced diameter end portion 367 of the finger opening rod 366.

The lower jaw 38 is quite similar to the upper jaw 36 and includes a cast body 418 having a flat face 420 for receiving the upper portion of a carton. An end wall 421 is formed integrally with the body 418 and projects outwardly from the face 420 for engaging the upper edge of said one carton wall. A side wall 422 is formed integrally with the body 418 and projects outwardly from the face 420 for engaging one longitudinal edge of said one side wall of the carton. A yoke 424 is integrally formed with the body 418 and is pivoted upon the projecting ends of the pivot shaft 358.

A carton gripping finger 426, which finger is identical to the finger 392, is pivotally connected to an ear 428 projecting outwardly from the body 418 by a shaft 430 which is screwed into the ear and is locked in place by a locknut 431. A torsion spring 432 is disposed between a ring 434 rigid with the shaft 430 and a collar 436 that is setscrewed to the shaft. One end of the torsion spring 432 is connected to the collar 436, and the other end of the spring is connected to the finger 426 to normally urge a carton engaging portion 438 of the finger into carton gripping position.

As indicated in FIGURE 9, when the spacing between the jaws 36 and 38 is at a minimum, which minimum spacing is 6 inches in the preferred embodiment of the invention, and when the gripping fingers 392 and 426 are in the gripping position, the adjustment bolt 372 on the end of the finger opening rod 366 is adjusted so that a clearance of about 0.005 inches exists between the bolt and the finger 426 when the other finger 392 is contacting the reduced diameter portion 367 of the finger opening rod 366. Thus, when the transfer head 42 is moving into the pickup station 170, engagement of the jaw opening trip rod 264 with the upper finger 392 will directly pivot the upper finger to its open position, and through the agency of the finger opening rod 366, will also open the lower gripping finger 426.

In order to pivotally interconnect the upper jaw 36 and lower jaw 38 so that the jaws will pivot equal amounts in opposite directions about their pivot shafts 352 and 358, one end of an adjustable link 440 (FIGS. 9 and 10) is pivotally connected to the lever arm 385 of the yoke 384 and its other end is pivotally connected to an ear 442 formed on the body 418 of the lower jaw 38. A tension spring 444 is connected to clips 446 and 448 (FIG. 10) which are pivotally mounted on the pivot shafts 352 and 358, respectively, and urge the jaws 36 and 38 inwardly toward each other. An abutment surface 450 (FIG. 9) on the ear 442 engages a cooperating abutment surface 452 on the main support body 336 of the transfer head 40 to limit inward movement of the jaws to the desired 6 inch center-to-center spacing. Thus, the link 440 interconnects the jaws 36 and 38 so that engagement of the cam follower 388 with the camming surfaces of the jaw spacing cam 278 at the discharge station 276 will cause the jaws to separate so as to substantially conform to the spacing of the carriers 46 on the conveyor 48 and so as to position the cartons for acceptance by the carriers in the curved path of movement of the conveyor 48 at the discharge station 276.

The transfer jaws 36 and 38 of each head 40 accurately places the cartons into associated carriers 46 and retains their grips on the cartons until after the carrier gates 50 have closed against the cartons to firmly support them in the associated carriers and to maintain the open upper ends squared. Immediately after each jaw is independently opened by the trip device 288, an anvil 52 of the forming turret is lowered into the released cartons to stabilize the upper ends thereof.

The carton forming turret 54 (FIGS. 2 and 17–21) comprises a stationary column 462 (FIG. 17) which is bolted to a stationary fill section frame 463. A tubular drive column 464 is journalled on the stationary column 462 by bearings 465 and 466. A drive sprocket 467 of the conveyor 48 and a splash apron 471 are bolted to a drive hub 472 which is supported on a vertically adjustable fill section frame 473. The frame 473 may be adjusted vertically by a series of hydraulic jacks 474 (only one being shown in FIGURE 17). The means for controlling the jacks 474 and adjusting the frame 473 is fully disclosed in the above mentioned Vadas et al. application and raises or lowers the carriers 46 thereby adapting the carton forming turret 54 to handle cartons of different sizes.

The hub 472 is supported on the adjustable frame 473 for vertical movement therewith by an annular support 476 which is bolted to the adjustable frame 473 and has the tubular column 464 projecting upwardly therethrough. A pair of mating thrust bearings 477 and 478 are connected to the lower end of the drive hub 472, and to the annular support 476 respectively thereby permitting rotation of the hub 472 relative to the annular support 476.

A tool supporting hub 482 is bolted to the upper end of the drive column 464 and has an upwardly projecting neck 483 rotatably received about a reduced diameter portion 484 of the stationary column 462. A vertically extending drive post 485 is bolted to the drive hub 472 and is slidably received in a drive block 482a that is rigidly secured to the tool supporting hub 482. It will be recognized that the drive post 485 transmits rotary motion from the drive hub 472 to the tool supporting hub 482 yet permits vertical motion of the drive hub 472 and associated parts relative to the tool supporting hub 472.

A non-rotatable cam supporting hub 486 is keyed to the reduced diameter portion 484 of the stationary column 462 and has a threaded counter bore in its upper end which receives the threaded body 487 of a height adjustment bushing 488. The bushing 488 includes a small diameter bore journalled on a small diameter portion 491 of the stationary column 462, and a large diameter bore journalled on the portion 484 of the column. A handle 493 screwed into the bushing 488 provides means for rotating the bushing and thereby raising or lowering the cam supporting hub 486 to the desired elevation. The cam supporting hub 486 is locked at the desired elevation by a threaded collar 494 which is screwed into the small diameter portion 491 of the stationary column 462. A handle 496 is screwed into the collar 494 to provide means for readily locking the collar 494 against the bushing 488.

An annular cam 497 having a lower continuous track 498, and an upper continuous annular track 500 is bolted to the cam supporting hub 486 and causes vertical reciprocation of the previously mentioned conical anvils 52 and top forming heads 53 of a plurality of forming head assemblies 502 in timed relation with the movement of the top forming turret 54 and transfer turret 42 which are connected together by drive means to be described hereinafter.

As mentioned previously, immediately after a carton at the discharge station 276 (FIG. 18) has been gripped by the pivotal gate 50 of the associated carrier 46, and has been released by the jaws 36 or 38 of the transfer turret 42, an anvil 52 is lowered into the upper end of the carton to stabilize the same. Although a forming turret 54 similar to that disclosed herein is described and claimed in a copending application of Gartin, Ser. No. 563,860, filed on even date herewith, it will be recognized that the anvils 52 cooperate to aid in accurately and reliably transferring the cartons from the transfer turret 42 and to the carriers 46 of the conveyor 48. Thus, only the anvils 52 and that portion of the turret 54 which controls the movement of the anvils into the cartons will be described herein.

In the preferred embodiment of the invention the top forming turret includes six forming head assemblies 502 which are equally spaced around the turret, and each assembly 502 includes one of the conical anvils 52 and one of the forming heads 53. Since all of the assemblies 502 are identical, only one assembly will be described in detail.

Each forming head assembly 502 (FIGS. 17-19) comprises a C-shaped sub-frame 504 which is bolted to the tool supporting hub 482 and slidably receives a vertically extending tubular shaft 506 in an upper hub 507 and in a lower hub 508. A forming head support plate 509 of the forming head 53 is welded to the lower end of the tubular shaft 506 thereby supporting the forming head for movement with the shaft. A vertically extending anvil supporting rod 511 is slidably received in the tubular shaft 506 and has the conical anvil 52 secured to its lower end. An abutment collar 512 is clamped against a shoulder 513 adjacent the upper end of the rod 511 by a nut 514 screwed on the rod. The collar 512 is disposed in position to engage the upper end of a stop screw 516 which is screwed into the upper hub 507, and is locked in adjusted position by a locknut 517.

In order to vertically reciprocate the shaft 506 and rod 511, and to prevent rotation of the same relative to the C-shaped sub-frame 504, split blocks 518 and 519 are clamped on the tubular shafts 506 and rod 511, respectively. As indicated in FIGURE 19, the split block 519 is clamped to a sleeve 521 which is slidably received on the outer surface of the tubular shaft 506. A shouldered lug 522 is screwed into the rod 511 and extends through a vertical slot 523 in the tubular shaft 506, through an opening 524 in the sleeve 521, and through an opening in the split block 519. A cam follower 526 is journalled on the lug 522 and is held in place by a nut 527. A cam follower 528 is disposed at substantially 90° relative to the follower 526 and is journalled on a capscrew 529 screwed into the split block 519. Similar cam followers 531 and 532 are journaled on capscrews secured to the split block 518 and are disposed in vertical alignment with the cam follower 526 and 528, respectively. During rotation of the forming turret 54, the cam follower 531 rides along the upper annular cam track 500, and the cam follower 526 rides along the lower track 498 thereby vertically reciprocating the forming head 53 and the anvil 52 in timed relation with the movement of the turret 54. The cam followers 528 and 532 are received in a vertical cam track 534 formed in the sub-frame 504 and serve to hold the rod 511 and the tubular shaft 506 from rotation relative to the sub-frame.

The conical anvil 52 (FIG. 18) comprises a lower frusto-conical lead-in portion 536 which aids in guiding the anvil into the open top closure of the carton C. The lead-in portion 536 is connected at a circumferential fulcrum edge 537 to an upper frusto-conical back-up portion 538 which is secured to the rod 511 as by welding. When the carton is transferred into its associated carrier 46, the conical anvil 52 is disposed above the carton as indicated at the left in FIGURE 18 and upon completion of the transfer operation is substantially immediately moved to its lowered active position within the carton as indicated in the right view in FIGURE 18. Since the anvil is circular in cross-section, and since the carton is square in cross section, it will be appreciated that there will be little difficulty in inserting the anvil 52 into the carton even if the carton is slightly misaligned, and that the circumferential fulcrum edge 537 will engage the carton only at the tangential points of the four walls.

The carriers 46 (FIGS. 22-28) of the conveyor 48 are arranged to receive the cartons from the transfer jaws 36 and 38 at the discharge station 276 when the carrier gates 50 are open and to firmly grip them by closing the gates at substantially the same time as the transfer jaws release the cartons. Although the carriers and their gate closing apparatus are described and claimed per se in an application to Gartin et al., Ser. No. 563,776, filed on even date herewith and assigned to the assignee of the present invention, the carriers and their operating components will be described herein since the carrier cooperates with the transfer jaws 36 and 38 to maintain complete control of the cartons during the transfer operation.

Each carrier 46 comprises a main body 544 having a pair of chain attachment pins (not shown) welded thereto and projecting downwardly therefrom for pivotal acceptance by the chain links of conveyor 48. The body 544 includes a rear upstanding wall 548, a side upstanding wall 550, and a carton squaring corner abutment 552 disposed on the upper portion of the free end of the rear wall 548, as indicated in FIGURE 22. The corner abutment 552 includes a vertical surface which is disposed at 45° to the vertical plane of the rear wall and is arranged to engage one upstanding edge of the carton to aid in squaring the carton.

Each carrier body 544 has one of the gates 50 pivotally connected thereto by means of a pivot pin 555 which extends through ears 556 and 557 formed in the body 554 and through a tongue 558 of the gate 50. The pivot pin 555 is locked in position by the head of a screw 559 (FIG. 23) that is screwed into the ear 556 adjacent the pin. The gate 50 also includes an upstanding from wall 560 which is integral with the tongue and with an actuating arm 562, which arm 562 extends rearwardly adjacent the side wall 550. The arm has a trip pin 564 on its rear end which projects transversely outwardly therefrom. The upstanding wall of the gate is received adjacent its lower edge so as to apply its gripping force against the carton at a point above its sealed bottom closure.

The gate 50 is arranged to assume three separate positions; an open position (FIG. 22) with the front wall 560 horizontal and the trip pin 564 in an elevated position; a carton gripping and squaring position (FIG. 27) with the front wall substantially vertical and the trip pin at an intermediate elevation, and an empty carrier position (FIG. 28) with the front wall angled rearwardly and the trip pin in a lowermost position. The gate 50 is held in the above position by a spring 566 (FIG. 26) which is received in a bore 568 in the body 544 and has one end thereof abutting a capscrew 570 screwed into the bore and has its other end abutting one end of an over center lock plunger 572 slidably received in the other end of the bore 568. The other end of the over-center lock plunger 572 abuts a block 576 that is pivoted on a pin 578 secured to the actuating arm 562 at a point which is eccentric relative to the pivot pin 555. The spring is of sufficient strength to maintain the gate 50 in adjusted position and to square the carton when the gate is closed.

A feature of the invention is that the front or gate wall 560 cooperates with the corner abutment 552 and rear wall 548 to square the upper end of the carton, which upper end would otherwise assume a diamond shape due to the resilience in the carton body which tends to return the carton body to a flat folded condition.

As the conveyor 48 moves each empty carrier 46 into the top forming turret 54, in the direction of arrow A (FIGS. 1 and 13-16), each carrier gate 50 is open, and accordingly, the trip pin 564 is in its uppermost position. The trip pin 564 of each gate 50 is disposed immediately adjacent the free end of an associated one of a plurality of gate actuating arms 580. Each arm 580 is rigidly secured as by bolting to the upper end of a pivot shaft 582 (FIGS. 17, 20 and 21), each of the pivot shafts being pivotally received in a pair of spaced ears 583 secured to and projecting outwardly from the drive hub 472. The shaft 582 is evenly spaced around the turret 54 and a cam arm 584 with a roller 586 on its free end is bolted to the lower end of each shaft 582 and projects outwardly therefrom. As best shown in FIGURES 20 and 21, a tension spring 587 is secured between an associated cam arm 584 and one of a plurality of ears 588 rigid the drive hub 472 so as to normally urge the arms 580 in a counterclockwise direction (FIG. 20) against adjustable stop bolts 589 (FIG. 3) secured to the drive hub 472.

When an empty carrier 46 enters the discharge station 276, the associated cam arm 584 on the shaft 582 moves into engagement with a trip device 592. The trip device 592 comprises a bracket 596 bolted to the annular support 476 to which a bell crank 598 is pivotally attached by a shouldered bolt 599. The bell crank includes a short upstanding trip finger 600 and a horizontal spring attachment arm 601 to which one end of a spring 602 is connected. The other end of the spring 602 is connected to the annular support 476 and normally holds the trip finger 600 in a vertical position. The spring 602 is provided so as to permit the finger 600 to pivot downwardly in the event the direction of movement of the conveyor 48 is momentarily reversed, as may occur during adjustment or maintenance of the machine, thus permitting the roller 586 on the cam arm 584 to contact and pivot the finger 600 and move therepast without injury to the trip device 592.

It will be understood that the trip device 592 is positioned relative to the forming turret 54 and transfer turret 42 so that the jaws 36 and 38 of the transfer head 40 at the discharge station 276 independently release the cartons into the associated carriers at the discharge station substantially simultaneously as the associated carrier gates 50 are closed to grip the cartons. Very shortly thereafter one of the anvils 52 is lowered into each carton to stabilize the upper ends thereof.

The drive mechanism 606 (FIG. 29) for the carton transfer apparatus 20 of the present invention comprises a variable speed motor M which is connected by a belt drive 603 to an overload clutch 604 such as a Maxitorq clutch Model No. 24, marketed by Carlyle Johnson Co., 52 Main St., Manchester, Conn. The clutch 604 drives a greater reducer 607 having an output shaft 608 connected by a flexible coupling 610 to the input shaft 612 of a gear box 614 of an intermittent driving unit 616, which driving unit includes a vertically extending intermittently driven shaft 618 to which the bottom forming turret 28 is connected. A first continuously driven output shaft 620 of the gear 614 is connected by a coupling 622 to a lower gear box 624 which is, in turn, coupled to an upper gear box 626 having an output shaft 628. A crank disc 630 is keyed to the output shaft 628 and has a crank pin 632 adjacent its periphery which pin is pivotally attached to one end of a link 634. The other end of the link 634 is pivotally connected to a lever 636 which is secured to a vertical shaft 638 pivoted in the frame 66. Another lever 640 is secured to the shaft 638 and has its free end pivotally connected to one end of a link 642. The other end of the link 642 is connected to a lever 644 which is secured to the shaft 126. Thus, the previously mentioned lever 124 is oscillated causing the stripper finger carrier 58 (FIG. 1) of the mandrel stripping mechanism 30 to reciprocate thereby stripping cartons from the mandrels 26 in timed relation with the intermittent movement of the bottom forming turret 28 and placing the cartons in the pickup station 170 for acceptance by the transfer turret 42.

A second continuously driven output shaft 646 of the gear box 614 is connected by a shaft 648 and couplings 650 to the input shaft 652 of a right angle gear box 654. The output shaft 656 (FIGS. 2 and 29) of the gear box 654 is connected by a shaft 658 and couplings 660 to the input shaft 662 of a gear box 664 having a vertical output shaft 666. A sprocket 668 keyed to the output shaft 666 is connected to the sprocket 236 of the transfer turret 42 by an endless chain 670 which is tensioned by an idler sprocket 672. A drive gear 674 keyed to the output shaft 666 meshes with a large diameter gear 676 which is secured to the tubular column 464 (FIG. 17) of the forming turret 54. Thus, the transfer turret 42 and top forming turret 54 are driven in timed relation with the bottom forming turret 28 and with the stripping finger carrier 58.

Although the operation of the carton transfer apparatus 20 of the present invention has been given during the description of the several components of the apparatus, a brief review of the operation will follow.

Cartons having their bottom closures sealed are disposed on each mandrel 26 (FIGS. 1 and 4) of the upper series and lower series of mandrels 26, which mandrels are intermittently indexed in upper and lower pairs into stripping position by the turret 28. With a pair of cartons indexed in position to be stripped from the mandrels 26 the stripping finger carrier 58 of the mendrel stripping mechanism 30 is moved toward the mandrel so that the upper stripper fingers 78 and the lower stripper fingers 80 engage the cartons and strip them from their mandrels 26 during movement of the carrier away from the mandrels 26. During this stripping action, the notches 116 (FIG. 5) in the upper fingers 78 and the notches 118 in the lower fingers 80 grip the cartons and retain their grip on the carton until the cartons have been moved into the pickup station 170 and have been gripped by the upper jaw 36 and lower jaw 38 of the transfer head 40 that is entering the pickup station.

The spacing of the upper jaw 36 and lower jaw 38 of the transfer head at the pickup station corresponds to the spacing of the mandrels 26, which in the preferred embodiment of the invention is six inches. The jaws 36 and 38 then grip the open end portions of the associated cartons and move them arcuately out of the pickup station 170 with the aid of the guiding effect offered by the concave surfaces 202 (FIGS. 3 and 7) of the stop arms 190 and 192. The stop arms 190 and 192 serve to prevent centrifugal force from causing the bottom closures of the cartons to swing radially outward relative to the axis of the transfer turret 42 during initial acceleration of the cartons out of the pickup station 170.

As the transfer head 40 swings the cartons from the pickup station 170 to the discharge station 276, the jaws are pivoted 90° about a horizontal axis so as to shift the cartons into upright position with their closed ends lowermost. Also during this time, the jaws 36 and 38 are pivoted away from each other so as to increase or otherwise control the spacing between cartons, which increased spacing is substantially equal to the spacing between the carriers 46 of conveyor 48. The outward swinging of the cartons by the jaws 36 and 38 about their parallel pivot axes not only increases the spacing but also positions the side walls of the cartons in planes parallel to the planes of the upstanding walls 548, 550 and 560 (FIG. 16) of the associated carriers 46 which are moving along an arcuate path which is tangent to the arcuate path of the jaws 36 and 38 at the point of transfer. Thus, the pivotal movement of the jaws 36 and 38 relative to each other is effective to orient the cartons with the carriers which are moving along an arcuate path that is tangent to the arcuate path of movement of the jaws.

When the carton walls have been substantially aligned with the registering walls of the carriers, the trip finger 298 (FIGS. 13–16) of the gripping finger trip device 288 engages the associated carton gripping finger 392 or 426 thereby opening the associated jaw 36 or 38 releasing the carton in the associated carrier 46. At the same time, the trip fingers 600 (FIGS. 17 and 21) engages the cam arm roller 586 thereby swinging the gate actuating arm 580 into (FIG. 16) engagement with the trip pin 564 to close the gate 50 of the associated carrier 46 into gripping engagement with the transferred carton before gripping control of the carton is released by the transfer jaws 36 or 38. Shortly thereafter one of the anvils 52 at the discharge station 276 is lowered into the upper end of the carton gripped by the carrier 46 and released by the transfer jaws 36 or 38 thereby completing the transfer operation.

From the foregoing description it will be apparent that the carton transferring apparatus of the present invention transfers two rows of cartons received from a bottom forming turret having mandrels spaced a predetermined distance apart directly into carriers on a single conveyor, which carriers are spaced a different distance apart. The carton transfer apparatus also shifts the cartons from horizontal positions to vertical positions during transfer and does not release gripping control with the cartons until after the cartons have been transferred into and have been gripped by the carriers. The cartons are then stabilized by anvils which are lowered into the upper ends of the cartons.

While one embodiment of the present invention has been shown and described, it will be understood that changes and modifications may be made therein without departing from the spirit of the invention or the scope of the appended claims.

The present invention and the manner in which the same is to be used having thus been described, what is claimed as new and desired to be protected by Letters Patent is:

1. A carton transfer apparatus comprising means for supporting a pair of spaced cartons having longitudinal axes spaced a predetermined distance apart, stripping means for gripping the cartons and for removing the cartons from said supporting means and placing the cartons into a pickup station, transfer means for gripping the cartons at said pickup station prior to release of the cartons by said stripping means and for moving the cartons along a predetermined path for release at a discharge station, carrier means movable along a single path through said discharge station for accepting the cartons from said transfer means, said carrier means including an endless conveyor having a plurality of carriers thereon spaced a second distance apart which is different than said predetermined distance, and means associated with said carrier means for gripping the cartons transferred onto said carrier means substantially simultaneously with the release of the cartons from said transfer means whereby gripping control of the cartons is maintained during transfer, said transfer means being arranged to change the spacing of the cartons from said predetermined distance to said second distance when moving the cartons from said pickup station to said discharge station.

2. An apparatus according to claim 1 wherein said supporting means supports the cartons with their longitudinal axes lying in parallel planes, and wherein said transfer means shifts the cartons 90° so that their longitudinal axes will lie in planes normal to said parallel planes when the cartons are accepted by said carrier means.

3. An apparatus according to claim 1 wherein said supporting means supports the cartons with their longitudinal axes horizontal, and wherein said transfer means shifts the cartons 90° so that their longitudinal axes will be vertical when the cartons are accepted by said carrier means.

4. An apparatus according to claim 1 wherein each of said carriers includes a pivotal gate, and means are provided for closing each gate against a lower wall portion of the carton placed therein by said transfer means to clamp the carton in said carrier prior to release of gripping control of the carton by the transfer means.

5. An apparatus according to claim 4 wherein each carrier includes an abutment surface adapted to engage one corner edge of the associated carton, and cooperates with said gate when closed to maintain the upper end of the carton square when the carton is released by said transfer means.

6. An apparatus according to claim 5 wherein stabilizing means is inserted into the upper open end of said carton after said carton has been clamped in said carrier.

7. An apparatus according to claim 6 wherein said stabilizing means is an anvil having a circular periphery, and wherein means are provided to lower the anvil into the carton shortly after the carton is clamped in its associated carrier.

8. An apparatus according to claim 1 wherein said transfer means comprises a driven turret, a transfer head pivoted on said turret about a horizontal pivotal axis, a pair of transfer jaws mounted on said head for pivotal movement about parallel axes which are normal to said horizontal pivot axis, means connecting said jaws for equal movement in opposite directions, means operatively connected to said jaws for closing said jaws into clamping engagement with said pair of cartons when the cartons are at said pickup station and are spaced said predetermined distance apart, means for shifting said head 90° about said horizontal pivot axis as said head moves from said pickup station to said discharge station, means operatively connected to said jaws for pivoting said jaws about said normal axes as said jaws enter said discharge station causing said jaws to space the cartons supported thereby a distance substantially equal to said second distance, and means for opening said jaws for releasing the cartons into said carriers.

9. A carton transfer apparatus comprising means for supporting a pair of spaced cartons having longitudinal axes spaced a predetermined distance apart, stripping means for gripping the cartons and for removing the cartons from said supporting means and placing the cartons into a pickup station, transfer means for gripping the cartons at said pickup station prior to release of the cartons by said stripping means and for moving the cartons along a predetermined path for release at a discharge station, carrier means movable along a single path through said discharge station for accepting the cartons from said transfer means, and means associated with said carrier means for gripping the cartons transferred onto said carrier means substantially simultaneously with the release of the cartons from said transfer means whereby gripping control of the cartons is maintained during transfer, said stripping means including a pair of opposed fingers associated with each carton for engaging edges of opposed walls thereof, each finger having a slot therein which is angled relative to the associated carton wall and relative to the slot in the other finger which engages and grips the opposed wall of the carton.

10. An apparatus according to claim 9 wherein said supporting means includes a mandrel and wherein said stripping means includes a reciprocable carrier having said pair of stripping fingers pivotally mounted thereon, and resilient means connected between said fingers and said carrier whereby movement of said carrier toward said mandrels causes the slotted ends of said fingers to pivot to a position wherein they ride over the associated side walls of the carton and snap into carton stripping position after moving past the open end of the carton.

11. A carton transfer apparatus comprising means for supporting a pair of spaced cartons having longitudinal axes spaced a predetermined distance apart; stripping means for gripping the cartons and for removing the cartons from said supporting means and placing the cartons into a pickup station; transfer means for gripping the cartons at said pickup station prior to release of the cartons by said stripping means and for moving the cartons along a predetermined path for release at a discharge station; said transfer means comprising a continuously driven turret, a transfer head pivoted on said turret about a first pivot axis, a pair of transfer jaws mounted on said head for pivotal movement about axes which are normal to said first pivot axis, means connecting said jaws for equal movement in opposite directions, means operatively connected to said jaws for closing said jaws in clamping engagement with a pair of cartons when said cartons are at said pickup station and are spaced said predetermined distance apart, means for shifting said head 90° about said first pivot axis as said head moves from said pickup station to said discharge station, and means for opening said jaws at said discharge station; carrier means movable along a single path through said discharge station for accepting the cartons from said transfer means; and means associated with said carrier means for gripping the cartons transferred onto said carrier means substantially simultaneously with the release of the cartons from said transfer means whereby gripping control of the cartons is maintained during the transfer.

12. A carton transfer apparatus comprising means for supporting a pair of spaced cartons having longitudinal axes spaced a predetermined distance apart, stripping means for gripping the cartons and for removing the cartons from said supporting means and placing the cartons into a pickup station, transfer means for gripping the cartons at said pickup station prior to release of the cartons by said stripping means and for moving the cartons along a predetermined path for release at a discharge station, carrier means movable along a single path through said discharge station for accepting the cartons from said transfer means, means associated with said carrier means for gripping the cartons transferred onto said carrier means substantially simultaneously with the release of the cartons from said transfer means whereby gripping control of the cartons is maintained during transfer, and adjustment means for adjusting said supporting means and said stripping means horizontally and said carrier means vertically so as to accommodate cartons of different sizes.

13. An apparatus for transferring cartons comprising releasable gripping means for simultaneously gripping a pair of cartons having longitudinal axes lying in parallel planes spaced a predetermined distance apart, means for rotating the gripped cartons 90° to place the axes of the cartons in planes normal to said first mentioned planes, carrier means movable along a single path having an arcuate portion and spaced apart a distance different from said predetermined distance, gate means on said carrier means for gripping the cartons, means for spacing the gripped cartons a distance apart equal to said different distance while moving the cartons along an arcuate path tangent to said arcuate portion of said single path between a pickup station and a discharge station, means for transferring the cartons one at a time from said pickup station to the carrier means at said discharge station when the cartons are at the tangent point of said paths, and means at said discharge station for individually releasing said gripping means from each carton and for simultaneously closing said gate means in gripping engagement with the carton.

14. A carton transfer apparatus comprising transfer means for gripping horizontally disposed cartons and for rotating the cartons into vertical positions, receiving means adjacent said transfer means for receiving the cartons from said transfer means and for supporting the cartons in a single row, means in said receiving means for gripping the cartons when placed in said receiving means and prior to the release of the cartons by said transfer means, and vertically movable stabilizing means disposed above said receiving means in position to enter the upper ends of the cartons after the cartons have been released by said transfer means.

15. In a carton transfer apparatus the combination of a turret movable about a vertical axis, a transfer head mounted on said turret for pivotal movement about a horizontal pivot axis, a pair of spaced jaws pivotally mounted on said head for pivotal movement about parallel axes which lie in a plane normal to said horizontal axis, drive means for rotating said turret to move said transfer head between a pickup station and a discharge station, support means at said pickup station for supporting a pair of cartons having longitudinal axes disposed horizontally and spaced a predetermined distance apart, means operatively connected to said jaws for closing said jaws into clamping engagement with the pair of cartons when the cartons are at said pickup station, means for shifting said head 90° about said horizontal pivot axis as said head is moving between said pickup station and said discharge station to shift the axes of the cartons to vertical positions, means for pivoting said jaws about said parallel axes as the jaws move into said discharge station to space the cartons a different distance apart, receiving means at said discharge station moving along a path tangent to said turret for receiving the cartons, and means for opening said jaws at said discharge station to release the cartons in a single file having a spacing different from that of said predetermined spacing.

16. An apparatus according to claim 15 and additionally comprising means for pivotally interconnecting said jaws for equal pivotal movement in opposite directions about said parallel axes, resilient means interconnecting said jaws for normally holding said jaws spaced apart said predetermined distance, resilient means for normally holding said jaws closed, and cam means adjacent said pickup station for simultaneously opening said jaws and for subsequently releasing the cartons into gripping engagement with the receiving means at said pickup station.

17. An apparatus according to claim 15 wherein each jaw includes a body, carton engaging flanges projecting outwardly from said body, a gripping finger pivoted on each body and having a gripping end portion projecting outwardly from said body and movable into a closed position opposed to one of said flanges, resilient means normally urging said gripping finger into said closed position toward said flange, cam means for engaging said finger on one of said jaws for opening said one finger, and a finger opening rod slidably received on said head and disposed between said fingers for transmitting the finger opening force from said finger on said one jaw to the finger on said other jaw when said head is at said pickup station.

18. An apparatus according to claim 17 wherein said finger opening rod is inoperative at said discharge station, and wherein means are provided for independently opening each of said fingers at said discharge station.

19. An apparatus according to claim 15 wherein said means for shifting said transfer head 90° about said horizontal pivot axis includes a gear segment rigid with said head, a rack disposed in meshing engagement with said segment, and cam means operatively connected to said rack to reciprocate the rack in timed relation with the movement of the turret causing said transfer head to shift 90° about said axis.

20. A carton transfer apparatus comprising means for supporting a pair of spaced cartons having longitudinal axes spaced a predetermined distance apart, stripping means for simultaneously gripping the pair of cartons and for simultaneously removing the cartons along linear paths from said supporting means and placing the cartons into a pickup station, transfer means for simultaneously gripping the pair of cartons at said pickup station prior to release of the cartons by said stripping means and for moving the cartons along a predetermined arcuate path for release at a discharge station while moving along said arcuate path, carrier means movable along a second arcuate path tangent to said predetermined arcuate path at said discharge station for accepting the cartons from said transfer means, and means associated with said carrier means for gripping the cartons transferred onto said carrier means substantially simultaneously with the release of the cartons from said transfer means whereby gripping control of the cartons is maintained during transfer.

21. In a carton transfer apparatus the combination of a turret movable about a first axis, a transfer head mounted on said turret for pivotal movement about a second pivot axis normal to said first axis, a pair of spaced jaws pivotally mounted on said head for pivotal movement about parallel axes which lie in a plane normal to said axis, drive means for rotating said turret to move said transfer head between a pickup station and a discharge station, support means at said pickup station for supporting a pair of cartons having longitudinal axes disposed parallel to said second axis and spaced a predetermined distance apart, means operatively connected to said jaws for closing said jaws into clamping engagement with a pair of cartons when the cartons are at said pickup station, means for shifting said head 90° about said second pivot axis as said head is moved between said pickup station and said discharge station to shift the axes of the cartons to positions parallel to said first axis, means for pivoting said jaws about said parallel axes as the jaws move into said discharge station to space the cartons a different distance apart, receiving means at said discharge station moving along a path tangent to said turret for receiving the cartons, and means for opening said jaws at said discharge station to release the cartons in a single file having a spacing different from that of said predetermined spacing.

22. A method of transferring cartons comprising the steps of simultaneously gripping a pair of cartons having longitudinal axes which lie in parallel planes spaced a predetermined distance apart, simultaneously moving the pair of gripped cartons along linear paths parallel to said axes for release at pickup stations, simultaneously regripping the pair of cartons at said pickup stations prior to release of the cartons at said stations and then moving the cartons along a predetermined arcuate path for release at a discharge station, rotating the pair of cartons to positions wherein their longitudinal axes are substantially normal to said planes while the cartons are moving along said arcuate path, spacing the longitudinal axes of the cartons a distance apart different from said predetermined distance while the cartons are moving along said arcuate path, individually releasing the cartons at said discharge station, and regripping the cartons substantially simultaneously as they are individually released from said arcuate path at said discharge station for movement in single file along another path.

References Cited

UNITED STATES PATENTS

| | | | |
|---|---|---|---|
| 733,460 | 7/1903 | Cormack | 198—179 |
| 2,154,126 | 4/1939 | Heyne | 198—25 |
| 3,095,082 | 6/1963 | Allgeyer | 198—34 X |
| 3,172,455 | 3/1965 | Rively et al. | 198—20 X |

EDWARD A. SROKA, *Primary Examiner.*

GERALD M. FORLENZA, *Examiner.*

R. J. HICKEY, *Assistant Examiner.*

UNITED STATES PATENT OFFICE
CERTIFICATE OF CORRECTION

Patent No. 3,378,128                            April 16, 1968

John Stevenson, Jr., et al.

It is certified that error appears in the above identified patent and that said Letters Patent are hereby corrected as shown below:

Column 5, line 44, "our" should read -- four --; line 52, "is" should read -- in --. Column 9, line 12, "rid" should read -- ride --. Column 12, line 61, "from" should read -- front --. Column 13, line 74, "greater" should read -- gear --. Column 14, line 5, after "gear" insert -- box --; line 50, "mendrel" should read -- mandrel --.

Signed and sealed this 17th day of March 1970.

(SEAL)
Attest:

Edward M. Fletcher, Jr.                          WILLIAM E. SCHUYLER, JR.
Attesting Officer                                      Commissioner of Patents